(12) United States Patent
Yamaguchi et al.

(10) Patent No.: US 6,258,405 B1
(45) Date of Patent: *Jul. 10, 2001

(54) COLOR FILTER MANUFACTURING METHOD AND APPARATUS, COLOR FILTER, DISPLAY DEVICE, APPARATUS HAVING DISPLAY DEVICE, AND PRINT METHOD

(75) Inventors: Nobuhito Yamaguchi, Inagi; Hideto Yokoi, Yokohama; Satoshi Wada, Machida; Hiroshi Fujiike, Yokohama, all of (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/801,816

(22) Filed: Feb. 14, 1997

(30) Foreign Application Priority Data

Feb. 16, 1996 (JP) .................................................. 8-029491
Dec. 20, 1996 (JP) .................................................. 8-341351

(51) Int. Cl.$^7$ ...................................................... B05D 5/06
(52) U.S. Cl. .................... 427/168; 427/162; 427/287; 427/422; 118/216; 118/313; 118/315; 347/17; 347/106; 347/107
(58) Field of Search .............................. 427/162, 168, 427/421, 422, 256, 287; 118/216, 300, 313, 315; 347/17, 106, 107

(56) References Cited

U.S. PATENT DOCUMENTS

| | | |
|---|---|---|
| 4,313,124 | 1/1982 | Hara .................... 346/140 R |
| 4,345,262 | 8/1982 | Shirato et al. ............ 346/140 R |
| 4,459,600 | 7/1984 | Sato et al. .............. 346/140 R |
| 4,463,359 | 7/1984 | Ayata et al. ................ 346/1.1 |
| 4,558,333 | 12/1985 | Sugitani et al. ............ 346/140 R |
| 4,608,577 | 8/1986 | Hori ..................... 346/140 R |

(List continued on next page.)

FOREIGN PATENT DOCUMENTS

| | | | |
|---|---|---|---|
| 0 570 167 A2 | 11/1993 | (EP) | ............... B41J/2/205 |
| 0 665 449 A1 | 8/1995 | (EP) | ............... G02B/5/20 |
| 0 675 384 A1 | 10/1995 | (EP) | ............... G02F/1/1335 |
| 0 675 385 A1 | 10/1995 | (EP) | ............... G02F/1/1335 |
| 738 905 | * 10/1996 | (EP) . | |
| 0 738 905 A2 | 10/1996 | (EP) | ............... G02B/5/22 |
| 0 754 553 A2 | 1/1997 | (EP) | ............... B41J/2/135 |
| 54-56847 | 5/1979 | (JP) . | |
| 59-75205 | 4/1984 | (JP) . | |
| 59-123670 | 7/1984 | (JP) . | |
| 59-138461 | 8/1984 | (JP) . | |
| 60-71260 | 4/1985 | (JP) . | |
| 61-283557 | 12/1986 | (JP) | ............... B41J/3/04 |
| 63-235901 | 9/1988 | (JP) . | |
| 1-217320 | 8/1989 | (JP) . | |
| 6-31936 | 2/1994 | (JP) . | |
| 7-242004 | 9/1995 | (JP) . | |
| 7-270608 | 10/1995 | (JP) . | |
| 7-290695 | 11/1995 | (JP) . | |
| 7-318723 | 12/1995 | (JP) . | |
| 7-318724 | 12/1995 | (JP) . | |
| WO 95/21400 | 8/1995 | (WO) | ............... G02F/1/1335 |

*Primary Examiner*—Shrive Beck
*Assistant Examiner*—Jennifer Calcagni
(74) *Attorney, Agent, or Firm*—Fitzpatrick, Cella, Harper & Scinto

(57) ABSTRACT

In a color filter manufacturing method according to the present invention, a color filter is manufactured by coloring the respective pixels with a plurality of discharged inks arranged in the scanning direction while an ink-jet head having a plurality of ink discharging nozzles in a direction substantially perpendicular to the scanning direction is scanned over a substrate. A coloring operation is performed while the ink discharging pattern is changed for each of the arrayed pixels or each pixel group.

79 Claims, 20 Drawing Sheets

U.S. PATENT DOCUMENTS

| | | | |
|---|---|---|---|
| 4,723,129 | 2/1988 | Endo et al. | 346/1.1 |
| 4,740,796 | 4/1988 | Endo et al. | 346/1.1 |
| 4,829,323 | 5/1989 | Suzuki et al. | 346/140 R |
| 5,550,568 * | 8/1996 | Misumi | 347/12 |
| 5,670,205 | 9/1997 | Miyazaki et al. | 427/64 |
| 5,714,195 * | 2/1998 | Shiba et al. | 427/140 |
| 5,760,797 * | 6/1998 | Koizumi et al. | 347/14 |
| 5,847,723 * | 12/1998 | Akahira et al. | 347/14 |
| 5,975,669 | 11/1999 | Ohshima | 347/14 |

* cited by examiner

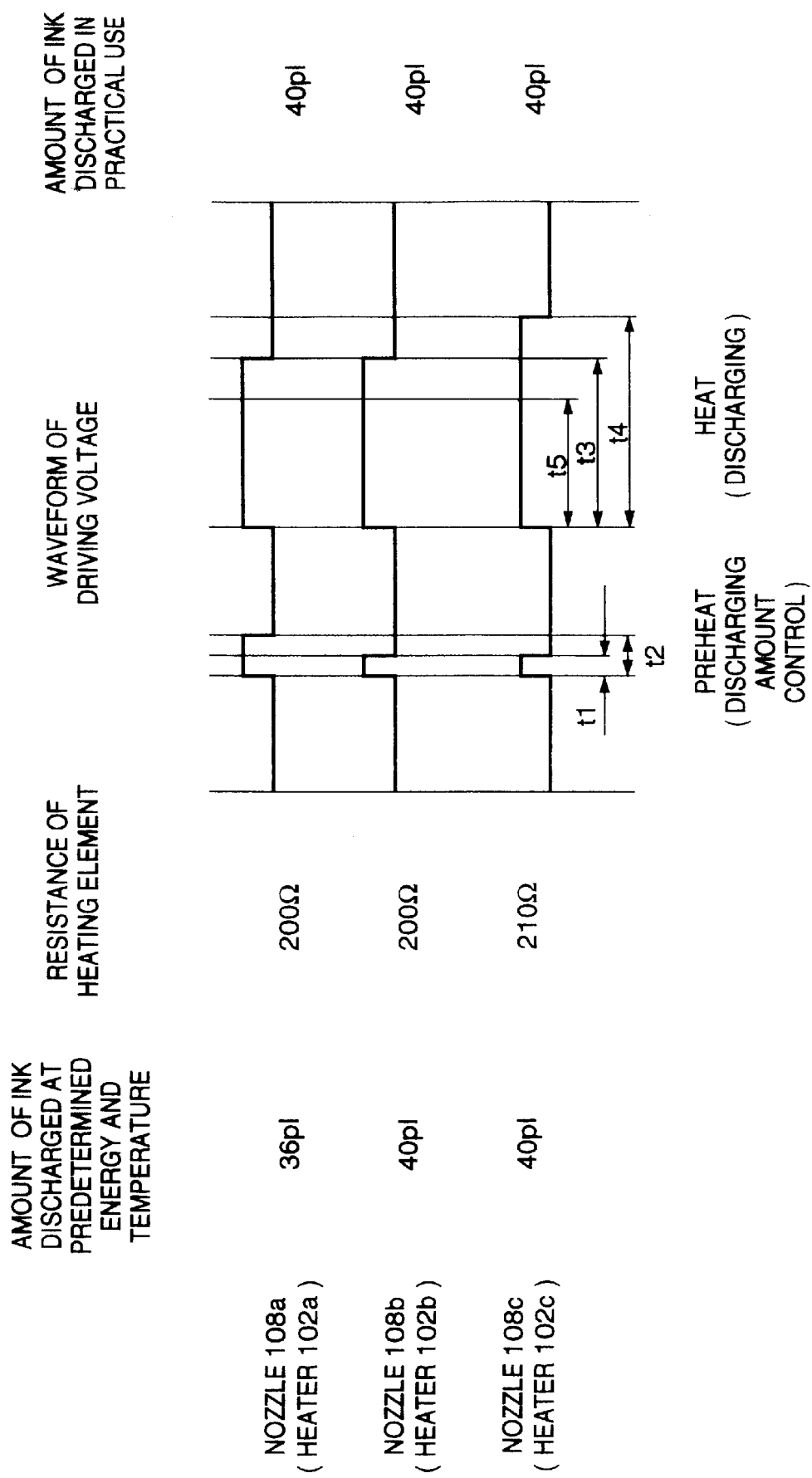

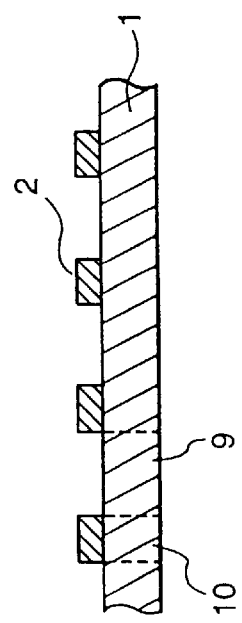
FIG. 5A
FIG. 5B
FIG. 5C
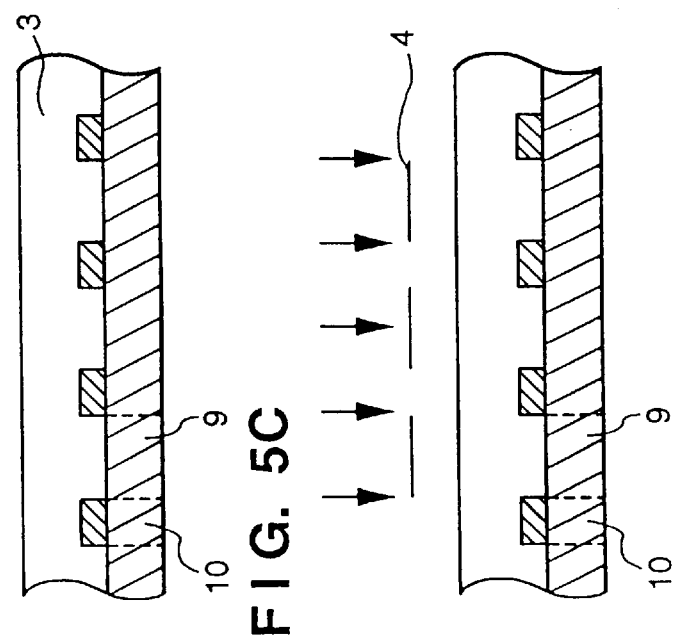
FIG. 5D
FIG. 5E
FIG. 5F

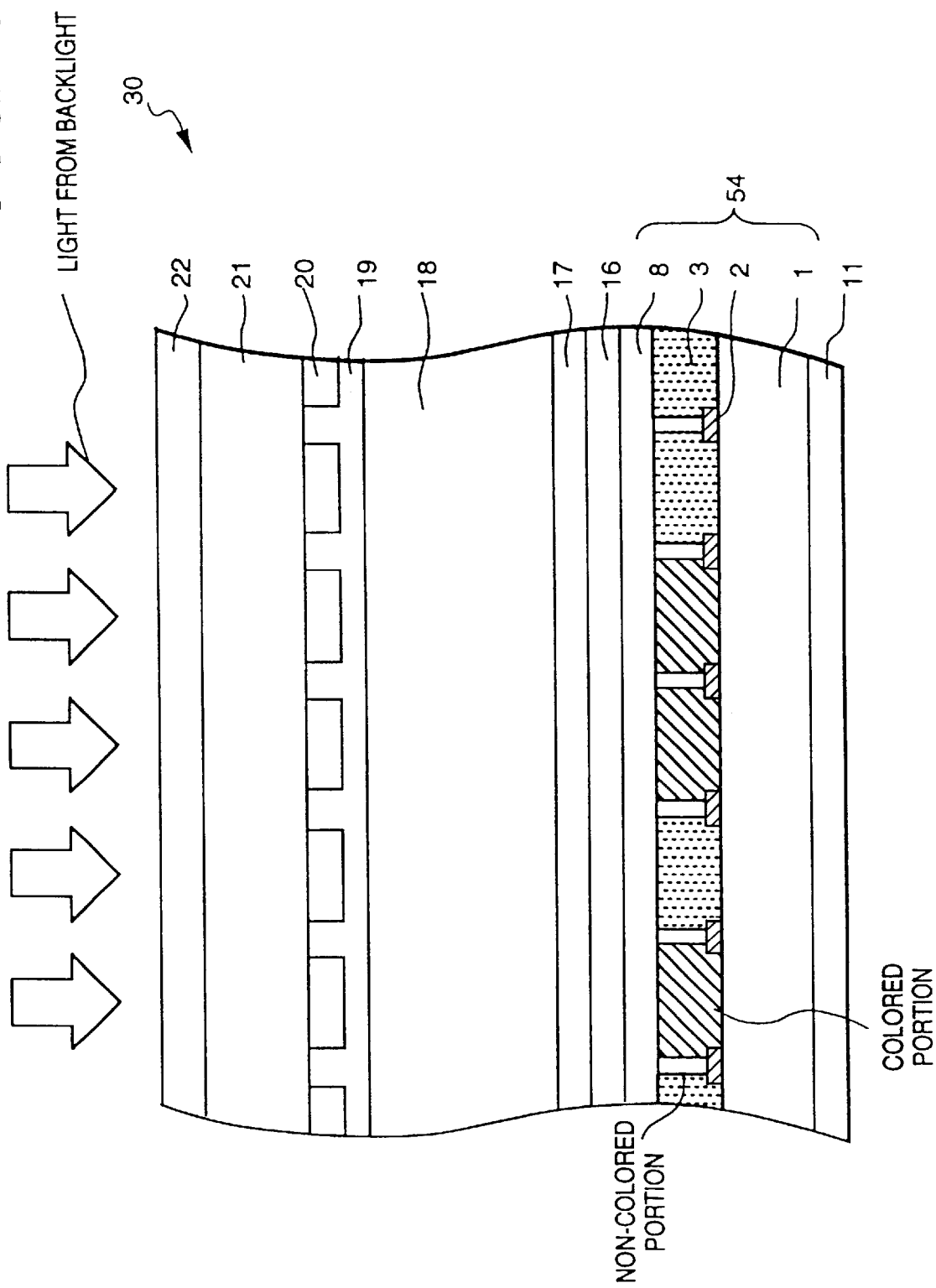

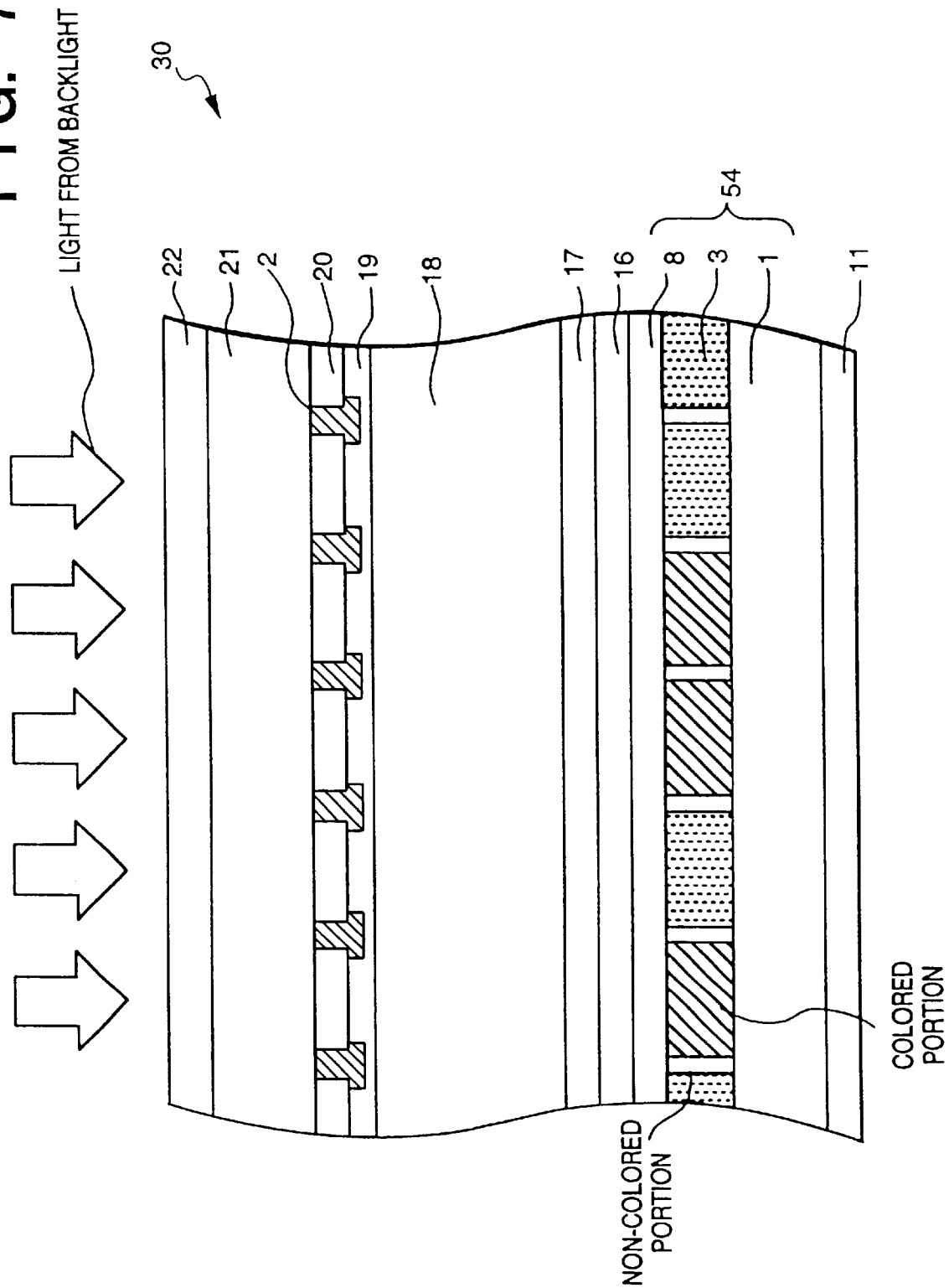

FIG. 15
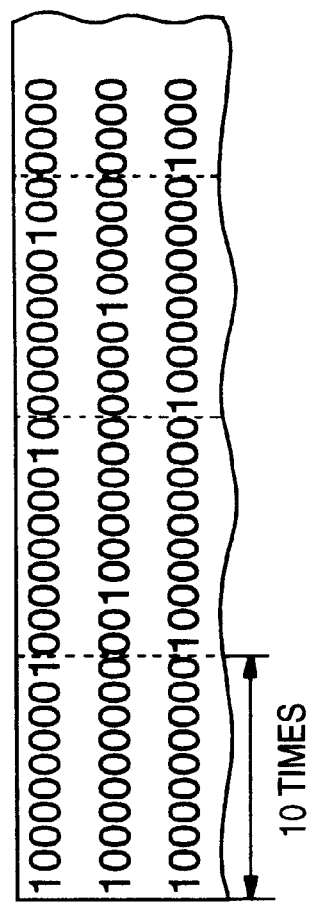

COLOR FILTER MANUFACTURING METHOD AND APPARATUS, COLOR FILTER, DISPLAY DEVICE, APPARATUS HAVING DISPLAY DEVICE, AND PRINT METHOD

BACKGROUND OF THE INVENTION

1. Field of the Invention

The present invention relates to a color filter manufacturing method and apparatus for manufacturing a color filter by discharging inks onto a substrate using ink-jet heads and coloring each pixel of the color filter, a color filter, a display device, an apparatus having the display device, and a print method.

2. Description of the Related Art

With recent advances in personal computers, especially portable personal computers, the demand tends to arise for liquid crystal displays, especially color liquid crystal displays. However, in order to further popularize the use of liquid crystal displays, a reduction in cost must be achieved. Especially, it is required to reduce the cost of a color filter which occupies a large proportion of the total cost. Various methods have been tried to satisfy the required characteristics of color filters while meeting the above requirements. However, any method capable of satisfying all the requirements has not been established. The respective methods will be described below.

The first method is a pigment dispersion method, which is currently replacing a dyeing method. In this method, a pigment-dispersed photosensitive resin layer is formed on a substrate and patterned into a single-color pattern. This process is repeated three times to obtain R, G, and B color filter layers.

The second method is the dyeing method. In the dyeing method, a water-soluble polymer material as a dyeable material is coated on a glass substrate, and the coating is patterned into a desired shape by a photolithography process. The obtained pattern is dipped in a dye bath to obtain a colored pattern. This process is repeated three times to form R, G, and B color filter layers.

The third method is an electrodeposition method. In this method, a transparent electrode is patterned on a substrate, and the resultant structure is dipped in an electrodeposition coating fluid containing a pigment, a resin, an electrolyte, and the like to be colored in the first color by electrodeposition. This process is repeated three times to form R, G, and B color filter layers. Finally, these layers are calcined.

The fourth method is a print method. In this method, a pigment is dispersed in a thermosetting resin, a print operation is performed three times to form R, G, and B coatings separately, and the resins are thermoset, thereby forming colored layers. In either of the above methods, a protective layer is generally formed on the colored layers.

The point common to these methods is that the same process must be repeated three times to obtain layers colored in three colors, i.e., R, G, and B. This causes an increase in cost. In addition, as the number of processes increases, the yield decreases. In the electrodeposition method, limitations are imposed on pattern shapes which can be formed. For this reason, with the existing techniques, it is difficult to apply this method to TFTs. In the print method, a pattern with a fine pitch is difficult to form because of poor resolution and poor evenness.

In order to eliminate these drawbacks, methods of manufacturing color filters by an ink-jet system are disclosed in Japanese Patent Laid-Open Nos. 59-75205, 63-235901, and 1-217320. In these methods, coloring solutions containing coloring agents of three colors, i.e., R (red), G (green), and B (blue), are sprayed on a transparent substrate by an ink-jet system, and the respective coloring solutions are dried to form colored image portions. In such an ink-jet system, R, G, and B filter elements (pixels) can be formed at once, allowing great simplification of the manufacturing process and a great reduction in cost.

In a color filter used for a general liquid crystal display device or the like, the opening portions (i.e., pixels) of the black matrix which partition off the respective pixels are rectangular, whereas the shapes of inks discharged from ink-jet heads are almost spherical. It is therefore difficult to discharge a required amount of ink for one pixel at once and uniformly spread the ink over the entire opening portion of the black matrix. For this reason, a plurality of inks are discharged onto each pixel while the ink-jet head is scanned with respect to the substrate, thereby coloring each pixel. In this case, if a plurality of inks are simply discharged onto the respective pixels uniformly, density irregularity may occur between a plurality of pixels in the process of coloring the pixels in the scanning direction when, for example, the amounts of inks discharged vary as the state of the ink-jet head changes over time. That is, the coloring density of the pixels colored in the first period of the scanning operation may differ from that of the pixels colored in the second period of the scanning operation.

In addition, a color filter is to be colored by using a multi-head having a plurality of ink discharging nozzles in a direction substantially perpendicular to the scanning direction, the amounts of ink discharged from the respective nozzles vary, and hence density irregularity may occur between the pixels arrayed in the direction substantially perpendicular to the scanning direction.

Such a problem is posed not only in the manufacture of the above color filter but also in a general printing operation using an ink-jet head.

SUMMARY OF THE INVENTION

The present invention has been made in consideration of the above problems, and has as its object to provide a color filter manufacturing method and apparatus which can manufacture a high-quality color filter with little density irregularity, a color filter manufactured by the method and apparatus, a display device having the color filter, an apparatus having the display device, and a print method of performing a print operation with little density irregularity.

In order to solve the above problems and achieve the above objects, according to the present invention, there is provided a method of manufacturing a color filter by coloring the respective pixels with a plurality of discharged inks arranged in a scanning direction while relatively scanning an ink-jet head over a substrate, the ink-jet head having a plurality of ink discharging nozzles in a direction substantially perpendicular to the scanning direction, comprising the step of performing a coloring operation while changing an ink discharging pattern for each of the arrayed pixels or each pixel group.

According to the present invention, there is provided an apparatus for manufacturing a color filter by coloring the respective pixels with a plurality of discharged inks arranged in a scanning direction while relatively scanning an ink-jet head over a substrate, the ink-jet head having a plurality of ink discharging nozzles in a direction substantially perpendicular to the scanning direction, comprising control means for controlling the ink-jet head to perform a coloring operation while changing an ink discharging pattern for each of the arrayed pixels or each pixel group.

According to the present invention, there is also provided a color filter manufactured by coloring the respective pixels with a plurality of discharged inks arranged in a scanning direction while relatively scanning an ink-jet head over a substrate, the ink-jet head having a plurality of ink discharging nozzles in a direction substantially perpendicular to the scanning direction, wherein a coloring operation is performed while an ink discharging pattern is changed for each of the arrayed pixels or each pixel group.

In addition, according to the present invention, there is provided a display device having a color filter manufactured by coloring the respective pixels with a plurality of discharged inks arranged in a scanning direction while relatively scanning an ink-jet head over a substrate, the ink-jet head having a plurality of ink discharging nozzles in a direction substantially perpendicular to the scanning direction, comprising a color filter colored by changing an ink discharging pattern for each of the arrayed pixels or each pixel group, and light amount changing means for changing a light amount.

Furthermore, according to the present invention, there is provided an apparatus including a display device having a color filter manufactured by coloring the respective pixels with a plurality of discharged inks arranged in a scanning direction while relatively scanning an ink-jet head over a substrate, the ink-jet head having a plurality of ink discharging nozzles in a direction substantially perpendicular to the scanning direction, comprising a display device integrally including a color filter colored by changing an ink discharging pattern for each of the arrayed pixels or each pixel group, and light amount changing means for changing a light amount, and image signal supply means for supplying an image signal to the display device.

Moreover, according to the present invention, there is provided a print method of performing a print operation while relatively scanning an ink-jet head over an object subjected to a print operation, the ink-jet head having a plurality of ink discharging nozzles in a direction substantially perpendicular to a scanning direction, comprising the step of performing a print operation while changing an ink discharging pattern for each of the plurality of ink discharging nozzles or each nozzle group.

Other objects and advantages besides those discussed above shall be apparent to those skilled in the art from the description of a preferred embodiment of the invention which follows. In the description, reference is made to accompanying drawings, which form a part thereof, and which illustrate an example of the invention. Such example, however, is not exhaustive of the various embodiments of the invention, and therefore reference is made to the claims which follow the description for determining the scope of the invention.

BRIEF DESCRIPTION OF THE DRAWINGS

FIG. 4 is a view for explaining a method of controlling the amounts of inks discharged by changing power supplied to heaters;

FIGS. 5A to 5F are sectional views showing the steps in manufacturing a color filter;

FIG. 6 is a sectional view showing the basic structure of a color liquid crystal display device incorporating a color filter according to an embodiment of the present invention;

FIG. 7 is a sectional view showing the basic structure of a color liquid crystal display device incorporating a color filter according to another embodiment of the present invention;

FIG. 15 is a view for explaining a method of correcting the differences between the amounts of ink discharged from the respective nozzles;

DETAILED DESCRIPTION OF THE PREFERRED EMBODIMENTS

The preferred embodiments of the present invention will be described in detail below with reference to the accompanying drawings.

Figure 1:
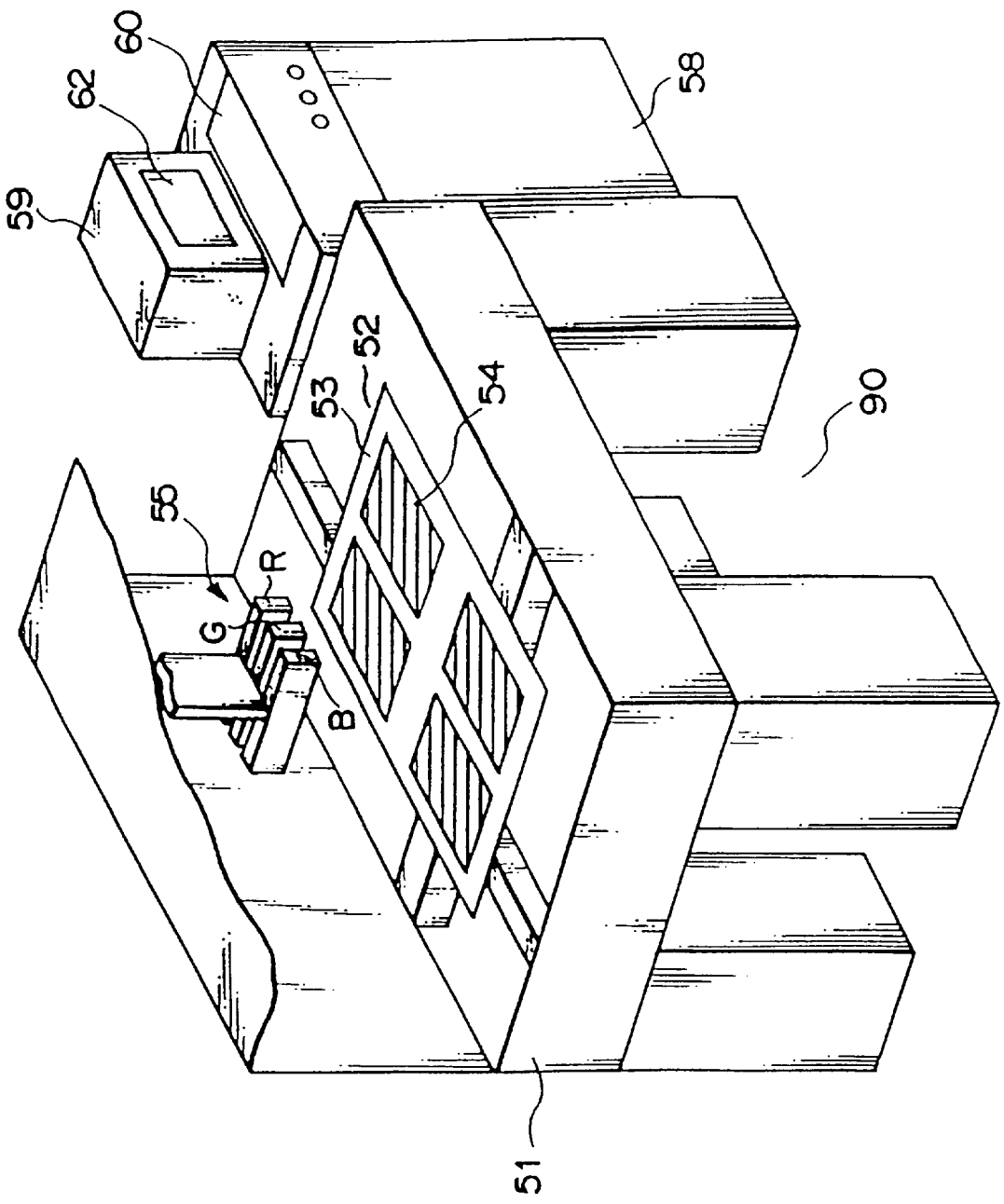
FIG. 1 is a perspective view showing the schematic arrangement of a color filter manufacturing apparatus according to an embodiment of the present invention.

FIG. 1 is a schematic view showing the arrangement of a color filter manufacturing apparatus according to an embodiment of the present invention.

Referring to FIG. 1, reference numeral 51 denotes an apparatus base; 52, an X-Y-θ stage disposed on the apparatus base 51; 53, a color filter substrate set on the X-Y-θ stage 52;

54, color filters formed on the color filter substrate 53; 55, R (red), G (green), and B (blue) ink-jet heads for coloring the color filters 54; 58, a controller for controlling the overall operation of a color filter manufacturing apparatus 90; 59, a teaching pendant (personal computer) as the display unit of the controller; and 60, a keyboard as the operation unit of the teaching pendant 59.

Figure 2:
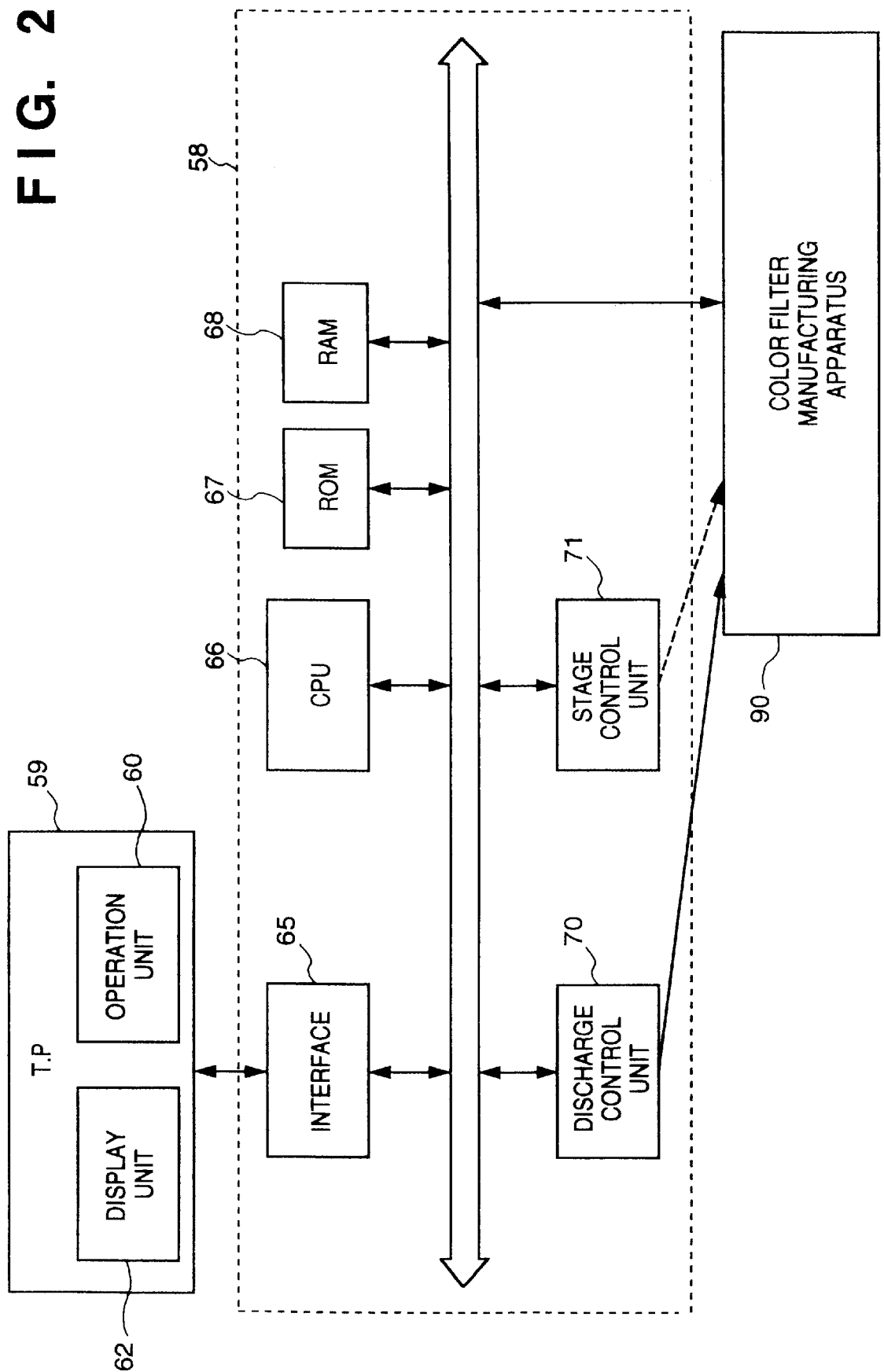
FIG. 2 is a block diagram showing the arrangement of a control unit for controlling the operation of the color filter manufacturing apparatus.

FIG. 2 is a block diagram showing the arrangement of the controller of the color filter manufacturing apparatus 90. The teaching pendant 59 serves as the input/output means of the controller 58. Reference numeral 62 denotes a display unit for displaying how a manufacturing process progresses, information indicating the presence/absence of a head abnormality, and the like. The keyboard 60 designates an operation of the color filter manufacturing apparatus 90 and the like.

The controller 58 controls the overall operation of the color filter manufacturing apparatus 90. Reference numeral 65 denotes an interface for exchanging data with the teaching pendant 59; 66, a CPU for controlling the color filter manufacturing apparatus 90; 67, a ROM storing control programs for operating the CPU 66; 68, a RAM for storing abnormality information and the like; 70, a discharge control unit for controlling discharging of an ink into each pixel of a color filter; and 71, a stage control unit for controlling the operation of the X-Y-θ stage 52 of the color filter manufacturing apparatus 90. The color filter manufacturing apparatus 90 is connected to the controller 58 and operates in accordance with instructions therefrom.

Figure 3:
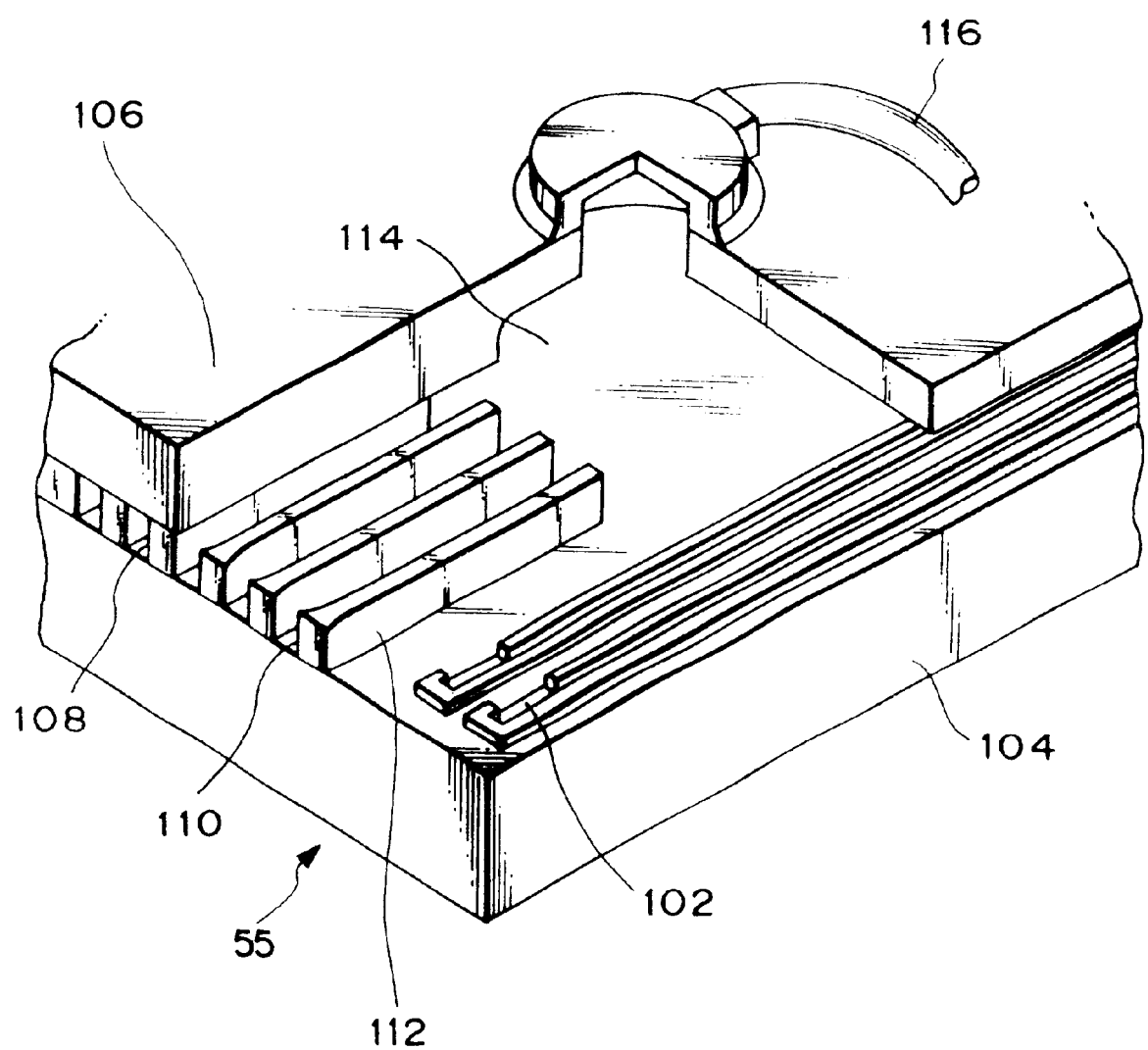
FIG. 3 is a perspective view showing the structure of an ink-jet head used for the color filter manufacturing apparatus.

FIG. 3 shows the structure of the ink-jet head 55 used in the color filter manufacturing apparatus 90. Referring to FIG. 1, three ink-jet heads are arranged in correspondence with three colors, i.e., R, G, and B. Since these three heads have the same structure, FIG. 3 shows the structure of one of the three heads as a representative.

Referring to FIG. 3, the ink-jet head 55 mainly comprises a heater board 104 as a board on which a plurality of heaters 102 for heating an ink are formed, and a ceiling plate 106 mounted on the heater board 104. A plurality of discharging openings 108 are formed in the ceiling plate 106. Tunnel-like fluid passages 110 communicating with the discharging openings 108 are formed therebehind. The respective fluid passages 110 are isolated from the adjacent fluid passages via partition walls 112. The respective fluid passages 110 are commonly connected to one ink chamber 114 at the rear side of the fluid passages. An ink is supplied to the ink chamber 114 via an ink inlet 116. This ink is supplied from the ink chamber 114 to each fluid passage 110.

The heater board 104 and the ceiling plate 106 are positioned such that the position of each heater 102 coincides with that of a corresponding fluid passage 110, and are assembled into the stat e shown in FIG. 3. Although FIG. 3 shows only two heaters 102, the heater 102 is arranged in correspondence wit h each fluid passage 110. When a predetermined driving signal is supplied to the heater 102 in the assembled state shown in FIG. 3, an ink above the heater 102 is boiled to produce a bubble, and the ink is pushed and discharged from the discharging opening 108 upon volume expansion of the ink. Therefore, the size of a bubble can be adjusted by controlling a driving pulse applied to the heater 102, e.g., controlling the magnitude of power. That is, the volume of the ink discharged from each discharging opening can be arbitrarily controlled.

FIG. 4 is a timing chart for explaining a method of controlling the amount of ink discharged by changing power supplied to each heater in this manner.

In this embodiment, two types of constant-voltage pulses are applied to each heater 102 to adjust the amount of ink discharged. The two pulses are a preheat pulse and a main heat pulse (to be simply referred to as a heat pulse hereinafter), as shown in FIG. 4. The preheat pulse is a pulse for heating an ink to a predetermined temperature before the ink is actually discharged. The pulse width of this pulse is set to be smaller than a minimum pulse width t5 required to discharge the ink. Therefore, the ink is not discharged by this preheat pulse. The preheat pulse is applied to each heater 102 to increase the initial temperature of the ink to a predetermined temperature in advance so as to always make the amount of ink discharged constant when a constant heat pulse is applied to the heater 102 afterward. In contrast to this, the temperature of the ink may be adjusted in advance by adjusting the width of a preheat pulse. In this case, for the same heat pulse, the amount of ink discharged can be changed. In addition, by heating ink before application of a heat pulse, the start time required to discharge the ink upon application of the heat pulse can be shortened to improve the responsibility.

The heat pulse is a pulse for actually discharging the ink. The pulse width of the heat pulse is set to be larger than the minimum pulse width t5 required to discharge the ink. Energy generated by each heater 102 is proportional to the width (application time) of a heat pulse. Therefore, variations in the characteristics of the heaters 102 can be adjusted by adjusting the width of each heat pulse.

Note that the amount of ink discharged can also be adjusted by adjusting the interval between a preheat pulse and a heat pulse to control the dispersed state of heat upon application of the preheat pulse.

As is apparent from the above description, the amount of ink discharged can be controlled both by adjusting the application time of a preheat pulse and by adjusting the interval between application of a preheat pulse and that of a heat pulse. Therefore, by adjusting the application time of a preheat pulse or the interval between application of a preheat pulse and that of a heat pulse as needed, the amount of ink discharged or the responsibility of discharging of the ink with respect to an applied pulse can be arbitrarily adjusted.

Such adjustment of the amount of ink discharged will be described in detail next.

Assume that an ink is discharged in different amounts from discharging openings (nozzles) 108a, 108b, and 108c upon application of the same voltage pulse, as shown in FIG. 4. More specifically, assume that when a voltage having a predetermined pulse width is applied at a predetermined temperature, the amount of ink discharged from the nozzle 108a is 36 pl (pico-liters); the amount of ink discharged from the nozzle 108b, 40 pl; and the amount of ink discharged from the nozzle 108c, 40 pl, and the resistance of heaters 102a and 102b corresponding to the nozzles 108a and 108b is 200Ω, and the resistance of a heater 102c corresponding to the nozzle 108c is 210Ω. Assume that the amounts of ink discharged from the nozzles 108a, 108b, and 108c are to be adjusted to 40 pl.

The widths of a preheat pulse and a heat pulse may be adjusted to adjust the amounts of ink discharged from the nozzles 108a, 108b, and 108c to the same amount. Various combinations of the widths of preheat pulses and heat pulses are conceivable. In this case, the amounts of energy generated by heat pulses are made equal for the three nozzles, and the amounts of ink discharged are adjusted by adjusting the widths of preheat pulses.

Since the heaters 102a and 102b for the nozzles 108a and 108b have the same resistance, i.e., 200Ω, the amounts of energy generated by heat pulses can be made equal by applying voltage pulses having the same width to the heaters 102a and 102b. In this case, the width of each voltage pulse is set to be t3 which is larger than the width t5. An ink is discharged in different amounts, i.e., 36 pl and 40 pl, from the nozzles 108a and 108b upon application of identical heat pulses. In order to increase the amount of ink discharged from the nozzle 108a, a preheat pulse having a width t2 larger than a width t1 of a preheat pulse applied to the heater 102b is applied to the heater 102a. With this operation, the amounts of ink discharged from the heaters 108a and 108b can be adjusted to 40 pl.

The heater 102c for the nozzle 108c has a resistance of 210Ω, which is higher than the resistance of the two remaining heaters 102a and 102b. For this reason, in order to cause the heater 102c to generate the same amount of energy as that generated by the two remaining heaters, the width of a heat pulse must be set to be larger than that of the above heat pulse. In this case, therefore, the width of the heat pulse is set to be t4 which is larger than the width t3. Since the amounts of ink discharged from the nozzles 108b and 108c upon application of a predetermined energy are the same, the width of a preheat pulse required is equal to that of a preheat pulse applied to the heater 102b. That is, a preheat pulse having the width t1 is applied to the heater 102c.

In the above manner, the same amount of ink can be discharged from the nozzles 108a, 108b, and 108c which discharge an ink in different amounts upon application of a predetermined pulse. In addition, the amounts of ink discharged may be intentionally made to differ from each other. Note that preheat pulses are used to reduce variations in the discharging operation of each nozzle.

FIGS. 5A to 5F show the process of manufacturing a color filter. The process of manufacturing a color filter 54 will be described next with reference to FIGS. 5A to 5F.

FIG. 5A shows a glass substrate 1 having a black matrix 2 for forming light-transmitting portions 9 and light-shielding portions 10. First of all, the glass substrate 1, on which the black matrix 2 is formed, is coated with a resin composition which has good ink receptivity but exhibits a deterioration in ink receptivity under a certain condition (e.g., irradiation of light or irradiation of light and heating), and is cured under a certain condition. The resultant structure is pre-baked, as needed, to form a resin composition layer 3 (FIG. 5B). The resin composition layer 3 can be formed by a coating method such as spin coating, roller coating, bar coating, spraying, or dipping. However, the present invention is not limited to any specific coating method.

Subsequently, pattern exposure is performed in advance onto resin layer portions on the light-shielding portions 10 by using a photomask 4 to make the exposed portions of the resin layer have receptivity for an ink (FIG. 5C). As a result, the resin composition layer 3 has ink-receiving portions 6 and portions 5 each exhibiting a deterioration in ink receptivity (FIG. 5D). In discharging inks while relatively scanning the ink-jet head over the substrate a plurality of numbers of times, the relative scanning operation may be performed by moving the substrate while the ink-jet head is fixed, or by moving the ink-jet head while the substrate is fixed.

After this step, R (red), G (green), and B (blue) inks are discharged onto the resin composition layer 3 by an ink-jet system to color the layer at once (FIG. 5E), and the inks are dried, as needed. As the ink-jet system, a system based on heat energy or a system based on mechanical energy may be used. Either of the systems will do. An ink to be used is not specifically limited as long as it can be used for an ink-jet operation. As coloring materials for the ink, materials suitable for the transmission spectra required for R, G, and B pixels are properly selected from various dyes and pigments. Although inks discharged from the ink-jet head may adhere to the resin composition layer 3 in the form of droplets, the inks preferably adhere to the layer in the form of columns without separating from the ink-jet head.

The colored resin composition layer 3 is cured by irradiation of light or irradiation of light and a heat treatment, and a protective layer 8 is formed, as needed (FIG. 5F). In order to cure the resin composition layer 3, the condition for the above process of forming the portions having affinities for an ink may be changed, e.g., the exposure amount in irradiation of light is increased, or the heating condition is made stricter. Alternatively, both irradiation of light and a heat treatment may be performed.

FIGS. 6 and 7 are sectional views each showing the basic structure of the color liquid crystal display device 30 incorporating the above color filter.

In general, a color liquid crystal display device is formed by joining the color filter substrate 1 to a counter substrate 21 and sealing a liquid crystal compound 18 therebetween. TFTs (Thin Film Transistors) (not shown) and transparent pixel electrodes 20 are formed on the inner surface of one substrate 21 of the liquid crystal display device in a matrix form. The color filter 54 is placed on the inner surface of the other substrate 1 such that the R, G, and B coloring materials are positioned to oppose the pixel electrodes. A transparent counter electrode (common electrode) 16 is formed on the entire surface of the color filter 10. The black matrix 2 is generally formed on the color filter substrate 1 side (see FIG. 6). However, in a BM (Black Matrix) on-array type liquid crystal display device, such a grating is formed on the TFT substrate side opposing the color filter substrate (see FIG. 7). Aligning films 19 are formed within the planes of the two substrates. By performing a rubbing process for the aligning films 19, the liquid crystal molecules can be aligned in a predetermined direction. Polarizing plates 11 and 22 are bonded to the outer surface of the respective glass substrates. The liquid crystal compound 18 is filled in the gap (about 2 to 5 $\mu$m) between these glass substrates. As a blacklight, a combination of a fluorescent lamp (not shown) and a scattering plate (not shown) is generally used. A display operation is performed by causing the liquid crystal compound to serve as an optical shutter for changing the transmittance for light emitted from the backlight.

A case wherein the above liquid crystal panel is applied to an information processing apparatus will be described below with reference to FIGS. 8 to 10.

Figure 8:
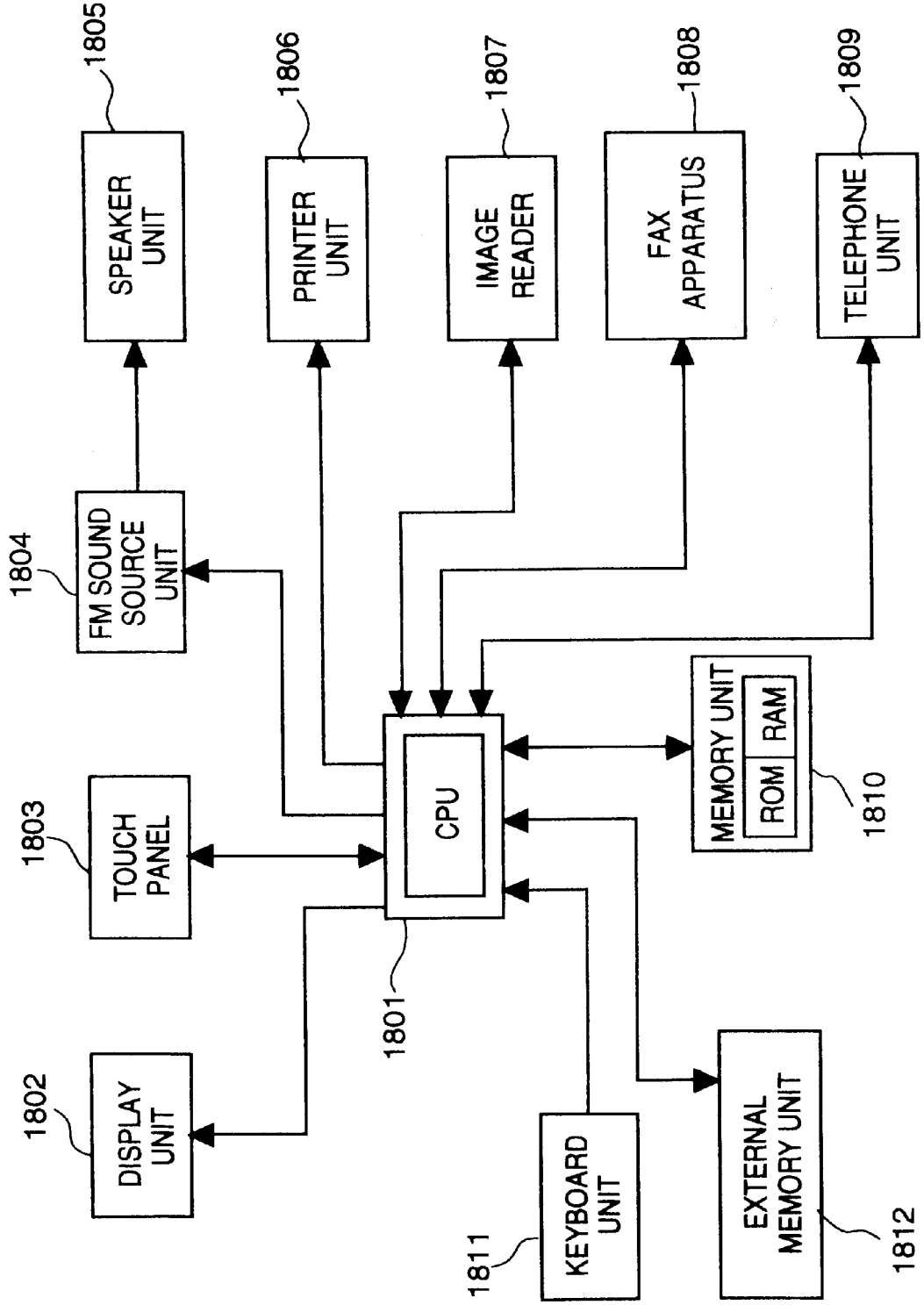
FIG. 8 is a block diagram showing an information processing apparatus using a liquid crystal display device.

FIG. 8 is a block diagram showing the schematic arrangement of an information processing apparatus serving as a wordprocessor, a personal computer, a facsimile apparatus, and a copying machine, to which the above liquid crystal display device is applied.

Referring to FIG. 8, reference numeral 1801 denotes a control unit for controlling the overall apparatus. The control unit 1801 includes a CPU such as a microprocessor and various I/O ports, and performs control by outputting/inputting control signals, data signals, and the like to/from the respective units. Reference numeral 1802 denotes a display unit for displaying various menus, document information, and image data read by an image reader 1807, and the like on the display screen; 1803, a transparent, pressure-sensitive touch panel mounted on the display unit 1802. By pressing the surface of the touch panel 1803 with a finger of the user or the like, an item input operation, a coordinate position input operation, or the like can be performed on the display unit 1802.

Reference numeral 1804 denotes an FM (Frequency Modulation) sound source unit for storing music information, created by a music editor or the like, in a memory unit 1810 or an external memory unit 1812 as digital data, and reading out the information from such a memory, thereby performing FM modulation of the information. An electrical signal from the FM sound source unit 1804 is converted into an audible sound by a speaker unit 1805. A printer unit 1806 is used as an output terminal for the wordprocessor, the personal computer, the facsimile apparatus, and the copying machine.

Reference numeral 1807 denotes an image reader unit for photoelectrically reading original data. The image reader unit 1807 is arranged midway along the original convey passage and designed to read originals for facsimile and copy operations and other various originals.

Reference numeral 1808 denotes a transmission/reception unit for the facsimile (FAX) apparatus. The transmission/reception unit 1808 transmits original data read by the image reader unit 1807 by facsimile, and receives and decodes a sent facsimile signal. The transmission/reception unit 1808 has an interface function for external units. Reference numeral 1809 denotes a telephone unit having a general telephone function and various telephone functions such as an answering function.

Reference numeral 1810 denotes a memory unit including a ROM for storing system programs, manager programs, application programs, fonts, and dictionaries, a RAM for storing an application program loaded from the external memory unit 1812 and document information, a video RAM, and the like.

Reference numeral 1811 denotes a keyboard unit for inputting document information and various commands.

Reference numeral 1812 denotes an external memory unit using a floppy disk, a hard disk, and the like. The external memory unit 1812 serves to store document information, music and speech information, application programs of the user, and the like.

Figure 9:
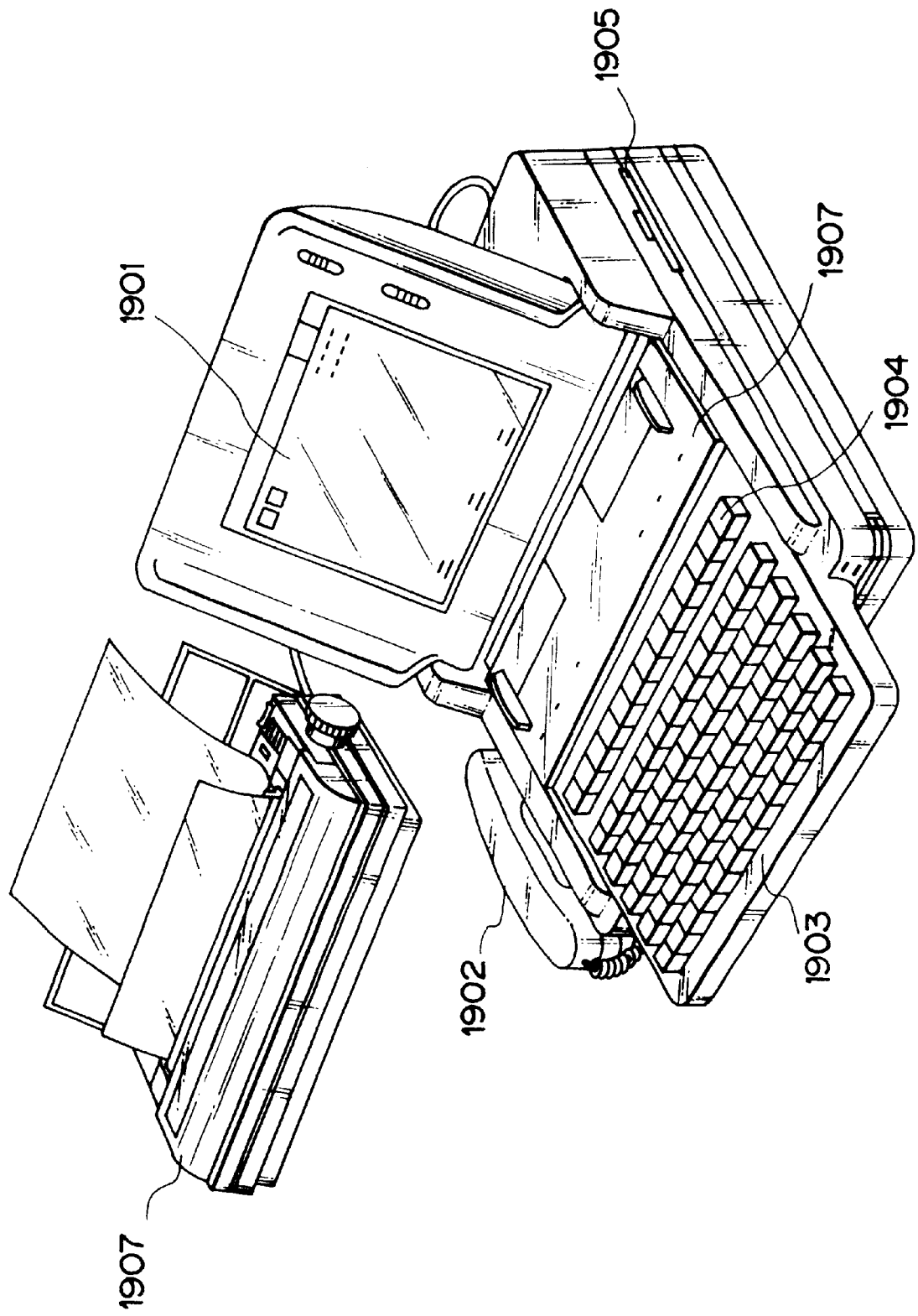
FIG. 9 is a perspective view showing the information processing apparatus using the liquid crystal display device.

FIG. 9 is a perspective view of the information processing apparatus in FIG. 8.

Referring to FIG. 9, reference numeral 1901 denotes a flat panel display using the above liquid crystal panel, which displays various menus, graphic pattern information, document information, and the like. A coordinate input or item designation input operation can be performed on the flat panel display 1901 by pressing the surface of the touch panel 1803 with a finger of the user or the like. Reference numeral 1902 denotes a handset used when the apparatus is used as a telephone set. A keyboard 1903 is detachably connected to the main body via a cord and is used to perform various document functions and input various data. This keyboard 1903 has various function keys 1904. Reference numeral 1905 denotes an insertion port through which a floppy disk is inserted into the external memory unit 1812.

Reference numeral 1906 denotes an original table on which an original to be read by the image reader unit 1807 is placed. The read original is discharged from the rear portion of the apparatus. In a facsimile receiving operation, received data is printed out by an ink-jet printer 1907.

When the above information processing apparatus is to serve as a personal computer or a wordprocessor, various kinds of information input through the keyboard unit 1811 are processed by the control unit 1801 in accordance with a predetermined program, and the resultant information is output, as an image, to the printer unit 1806.

When the information processing apparatus is to serve as the receiver of the facsimile apparatus, facsimile information input through the transmission/reception unit 1808 via a communication line is subjected to reception processing in the control unit 1801 in accordance with a predetermined program, and the resultant information is output, as a received image, to the printer unit 1806.

When the information processing apparatus is to serve as the copying machine, an original is read by the image reader unit 1807, and the read original data is output, as an image to be copied, to the printer unit 1806 via the control unit 1801. Note that when the information processing apparatus is to serve as the receiver of the facsimile apparatus, original data read by the image reader unit 1807 is subjected to transmission processing in the control unit 1801 in accordance with a predetermined program, and the resultant data is transmitted to a communication line via the transmission/reception unit 1808.

Figure 10:
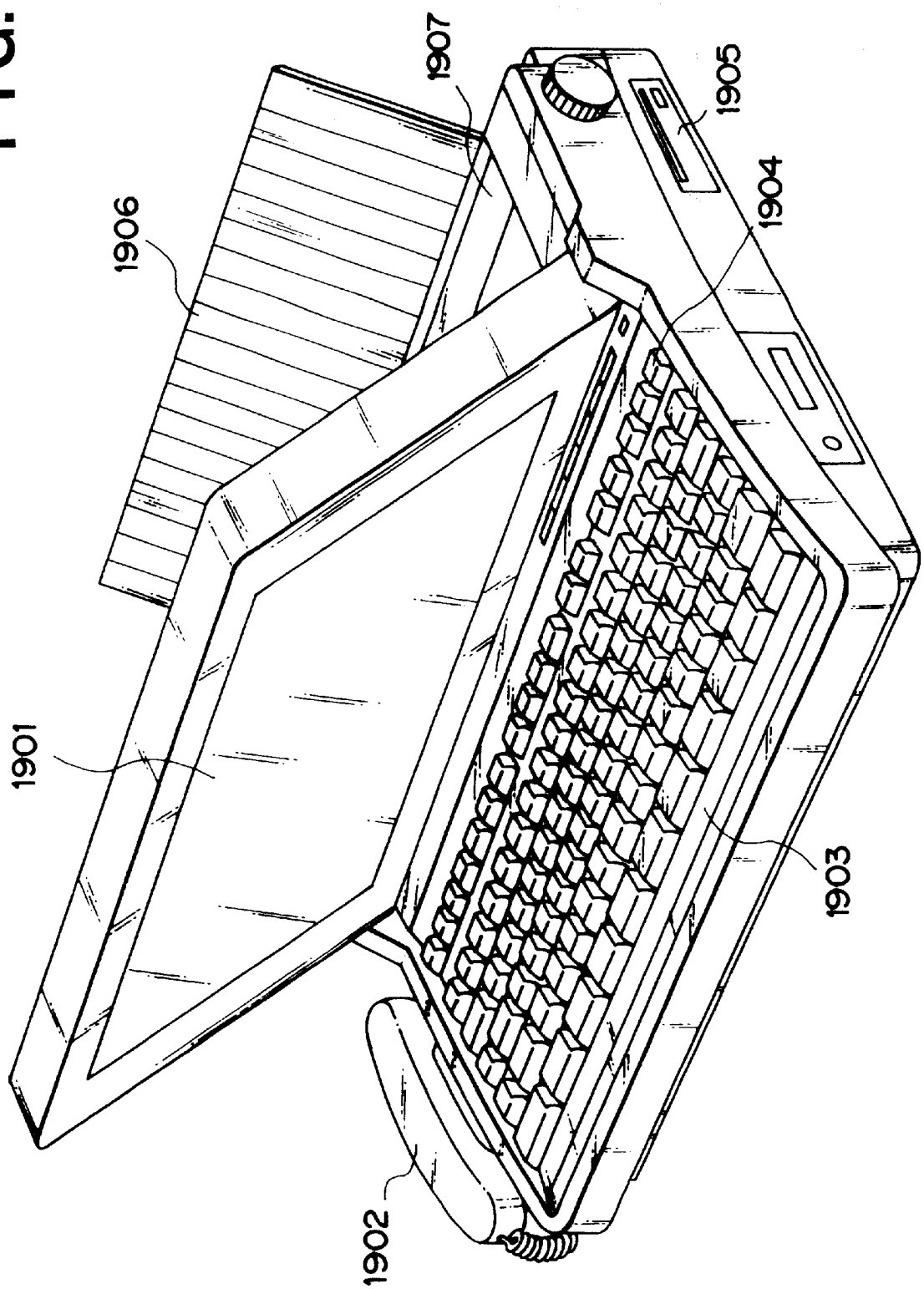
FIG. 10 is a perspective view showing the information processing apparatus using the liquid crystal display device.

Note that the above information processing apparatus may be designed as an integrated apparatus incorporating an ink-jet printer in the main body, as shown in FIG. 10. In this case, the portability of the apparatus can be improved. The same reference numerals in FIG. 10 denote parts having the same functions as those in FIG. 9.

Two typical methods of reducing density irregularity in the respective pixels of a color filter will be described next.

Figure 11:
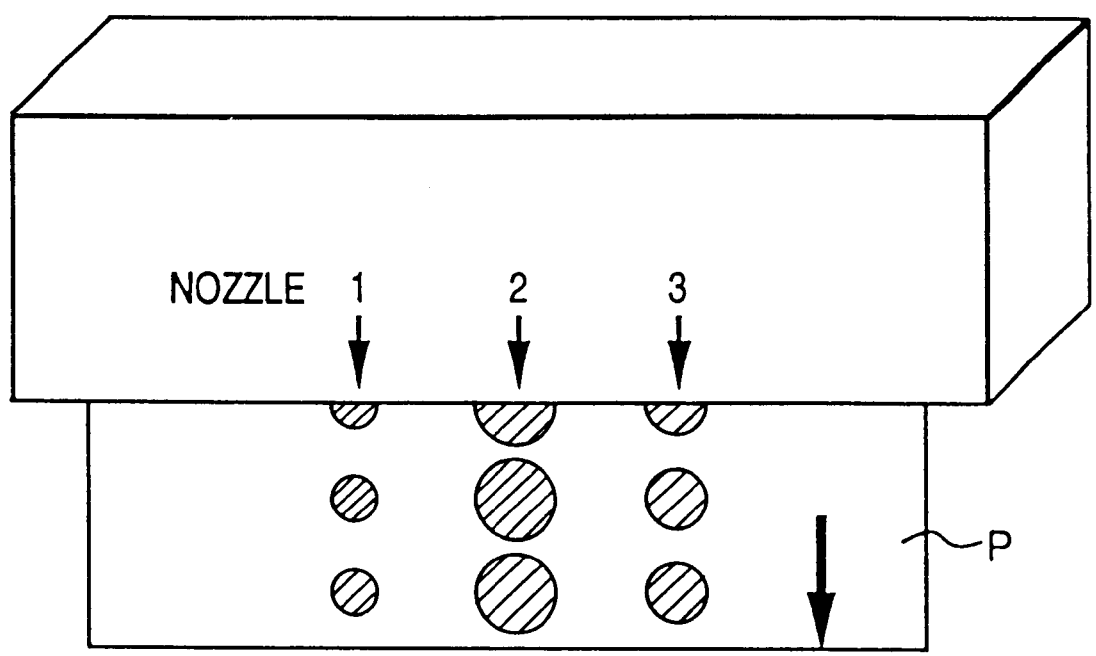
FIG. 11 is a view for explaining a method of correcting the differences between the amounts of ink discharged from the respective nozzles.
Figure 12:
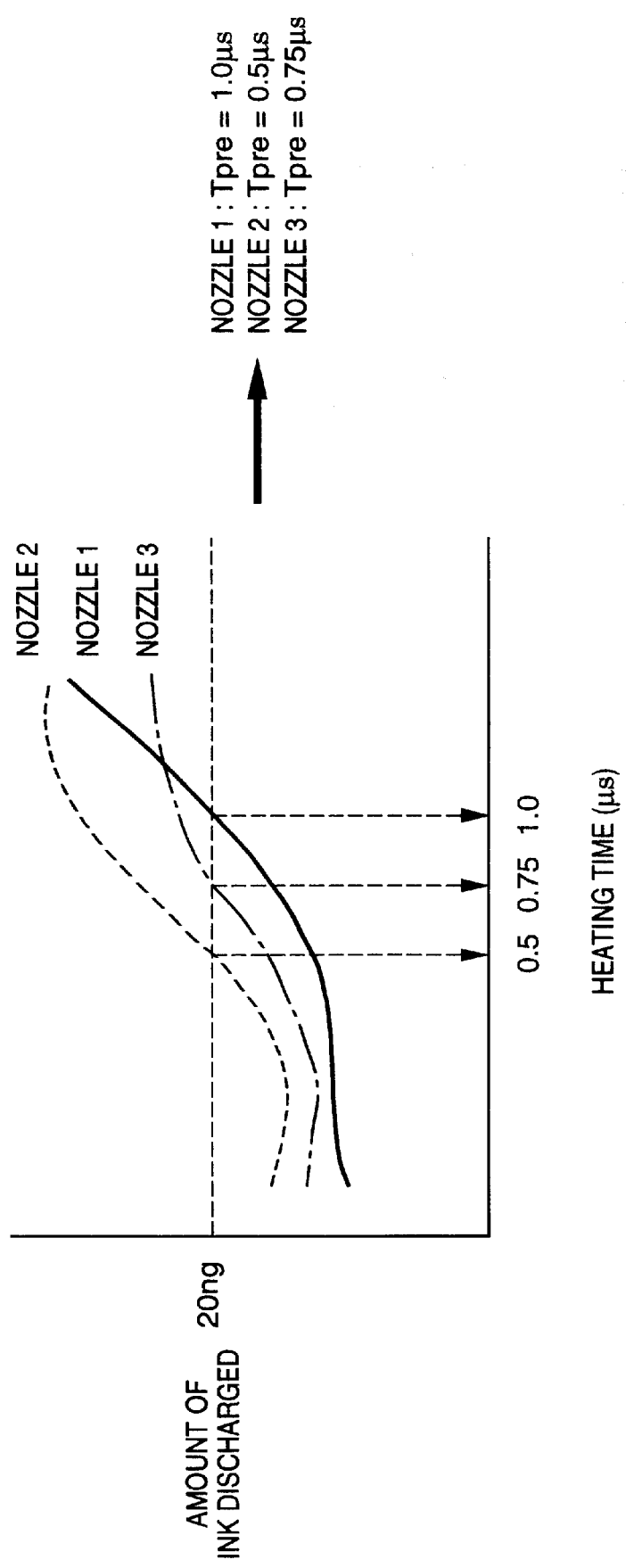
FIG. 12 is a graph for explaining the method of correcting the differences between the amounts of ink discharged from the respective nozzles.
Figure 13:
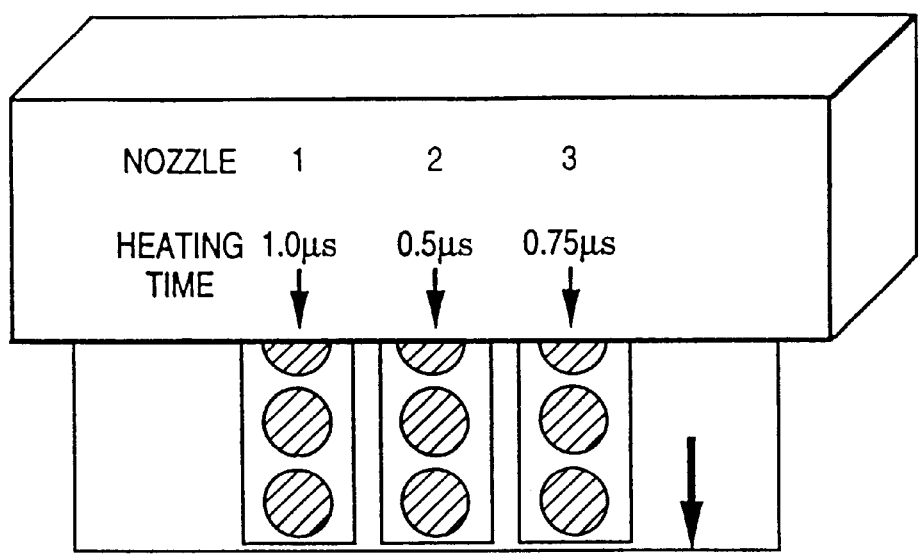
FIG. 13 is a view for explaining the method of correcting the differences between the amounts of ink discharged from the respective nozzles.

FIGS. 11 to 13 show a method (to be referred to as bit correction) of correcting the differences between the amounts of inks discharged from the respective nozzles of an ink-jet head IJH having a plurality of ink discharging nozzles.

First of all, as shown in FIG. 11, the ink-jet head IJH discharges inks from three nozzles 1, 2, and 3, for example, onto a predetermined substrate P, and measures the sizes of ink dots formed on the substrate P by the inks discharged from the respective nozzles, thereby measuring the amounts of inks discharged from the respective nozzles. In this case, a heat pulse (see FIG. 4) applied to the heater of each nozzle is set to a predetermined width, and the width of a preheat pulse (see FIG. 4) is changed, as described above. With this operation, curves representing the relationships between the widths of preheat pulses (represented by the heating times in FIG. 12) and the amounts of inks discharged are obtained, as shown in FIG. 12. Assume that all the amounts of inks discharged from the respective nozzles are to be uniformly set to 20 ng. In this case, as is apparent from the curves in FIG. 12, the widths of preheat pulses to be applied to the nozzles 1, 2, and 3 are 1.0 $\mu$s, 0.5 $\mu$s, and 0.75 $\mu$s, respectively. Therefore, by applying the preheat pulses having these widths to the heaters of the respective nozzles, all the amounts of ink discharged from the respective nozzles can be uniformly set to 20 ng, as shown in FIG. 13. This method of correcting the amounts of ink discharged from the respective nozzles is called bit correction. In this embodiment, the width of each preheat pulse is changed in four steps to realize a correction width of about 30%. The resolution of this correction is 2 to 3%.

Figure 14:
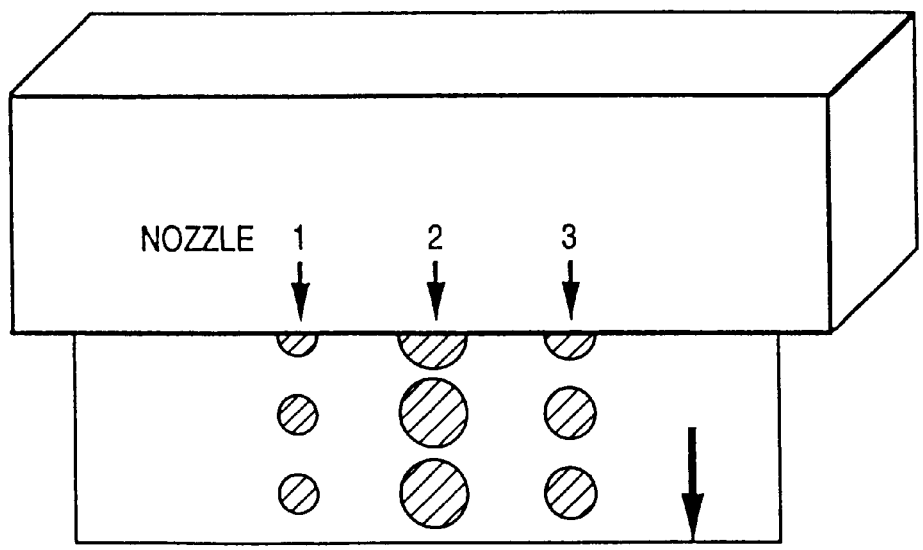
FIG. 14 is a view for explaining a method of changing ink discharging densities.
Figure 16:
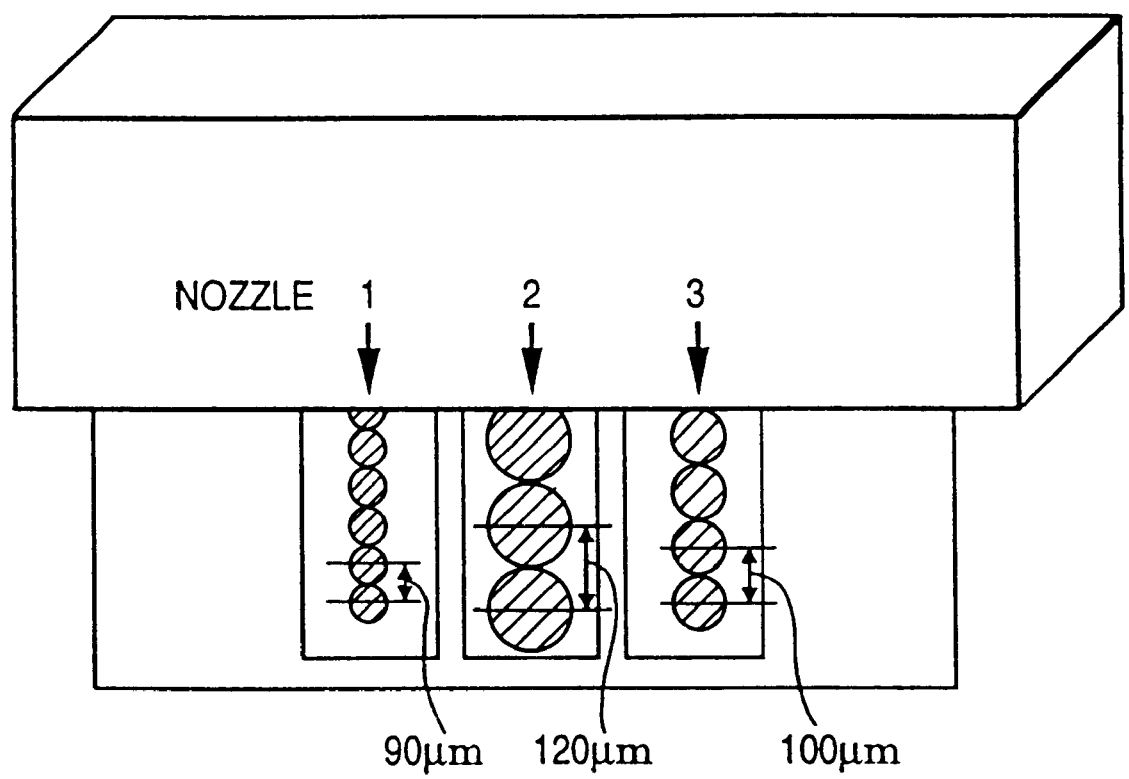
FIG. 16 is a view for explaining the method of correcting the differences between the amounts of inks discharged from the respective nozzles.

FIGS. 14 to 16 show a method (to be referred to as shading correction hereinafter) of correcting density irregularity in the scanning direction of an ink-jet head by adjusting the discharging densities of inks from the respective ink discharging nozzles.

Assume that the amounts of ink discharged from the nozzles 1 and 2 of the ink-jet head are −10% and +20%, respectively, with respect to the amount of ink discharged from the nozzle 3, as shown in FIG. 14. In this case, while the ink-jet head IJH is scanned, one heat pulse is applied to the heater of the nozzle 1 for every nine reference clocks, one heat pulse is applied to the nozzle 2 for every 12 reference clocks, and one heat pulse is applied to the nozzle 3 for every 10 reference clocks, as shown in FIG. 15. With this operation, the number of times an ink is discharged in the scanning direction is changed for each nozzle to make the ink densities in the respective pixels of the color filter in the scanning direction uniform, as shown in FIG. 16, thereby preventing density irregularity of the respective pixels. This method of correcting the ink discharging densities in the scanning direction is called shading correction. In this embodiment, a correction width of about 40% is realized by this correction. Although control can be performed with an unlimited resolution of correction, a large amount of data is required, and the operation speed decreases. For this reason, the practical resolution is preferably limited to about 10%.

A method of further reducing the coloring density differences between the respective pixels by combining the above bit correction and shading correction will be described below. This method is a characteristic feature of this embodiment.

In the above bit correction, as described above, the resolution of density correction is high, but the correction width is small. In contrast to this, in shading correction, the width of density correction is large, but the resolution of correction is low. For this reason, this embodiment uses a method of performing shading correction first to reduce the density differences between the respective pixels to about 10%, and then performing bit correction to reduce the density differences between the respective pixels to 2.5% or less.

Figure 17:
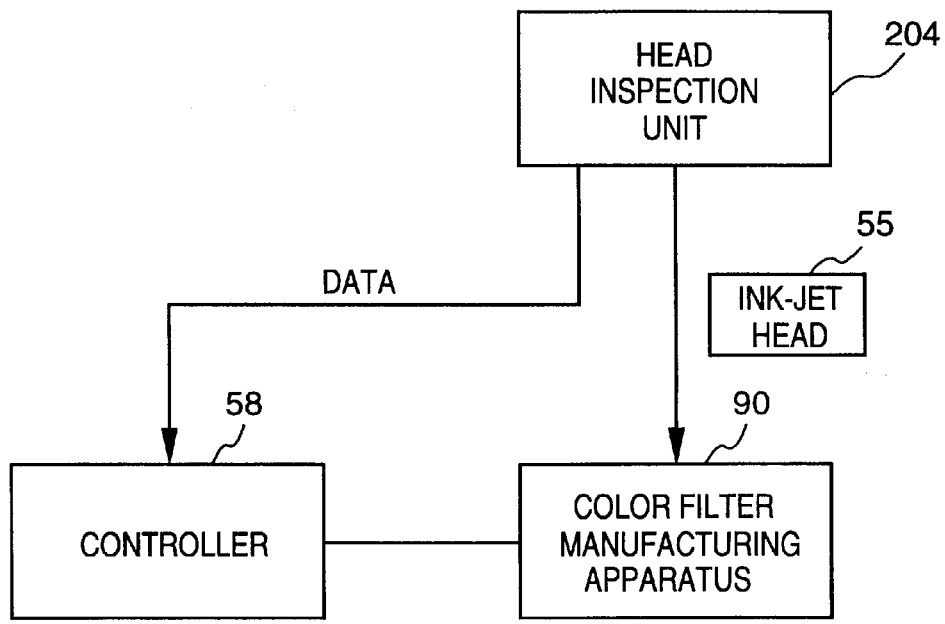
FIG. 17 is a block diagram showing the relationship between a head inspection unit and a color filter manufacturing apparatus.

As described above, in order to perform bit correction and shading correction, variations in the amounts of ink discharged from the respective discharging nozzles of the ink-jet head 55 must be checked. For this reason, as shown in FIG. 17, a head inspection unit 204 inspects the ink-jet head 55 to measure the amounts of ink discharged from the respective nozzles and generate data about the relationship between the amounts of ink discharged from the respective nozzles and the widths of preheat and heat pulses. The ink-jet head 55 having undergone the inspection is mounted on the color filter manufacturing apparatus 90, and the generated data is sent to the controller 58.

Figure 18:
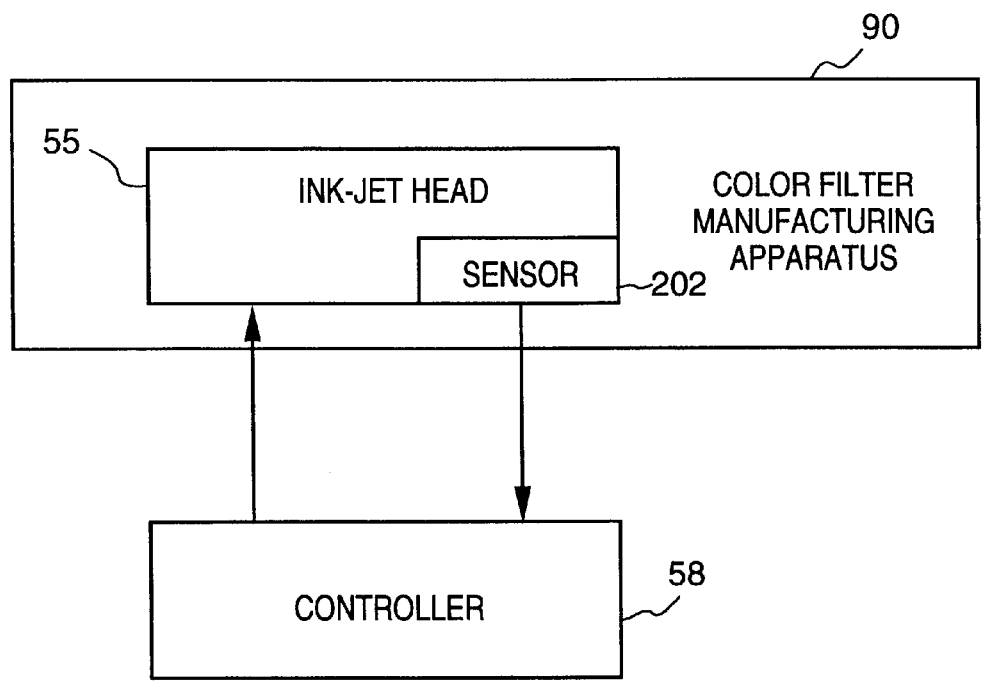
FIG. 18 is a block diagram showing the sensor mounted on the head.

In addition, since changes in the amounts of ink discharged from the respective nozzles of the ink-jet head 55 with the lapse of time must be detected, a sensor 202 or the like for detecting the temperature of the ink-jet head is mounted on the head, as shown in FIG. 18. While a signal from this sensor 202 is monitored by the controller 58, the application intervals of preheat and heat pulses applied to the respective heaters of the ink-jet head 55 are controlled. Data about the relationship between the amounts of ink discharged from the respective nozzles of the ink-jet head and the value of a detection signal from the sensor 202 such as a temperature detector is measured in advance by the head inspection unit 204 shown in FIG. 17.

Figure 19:
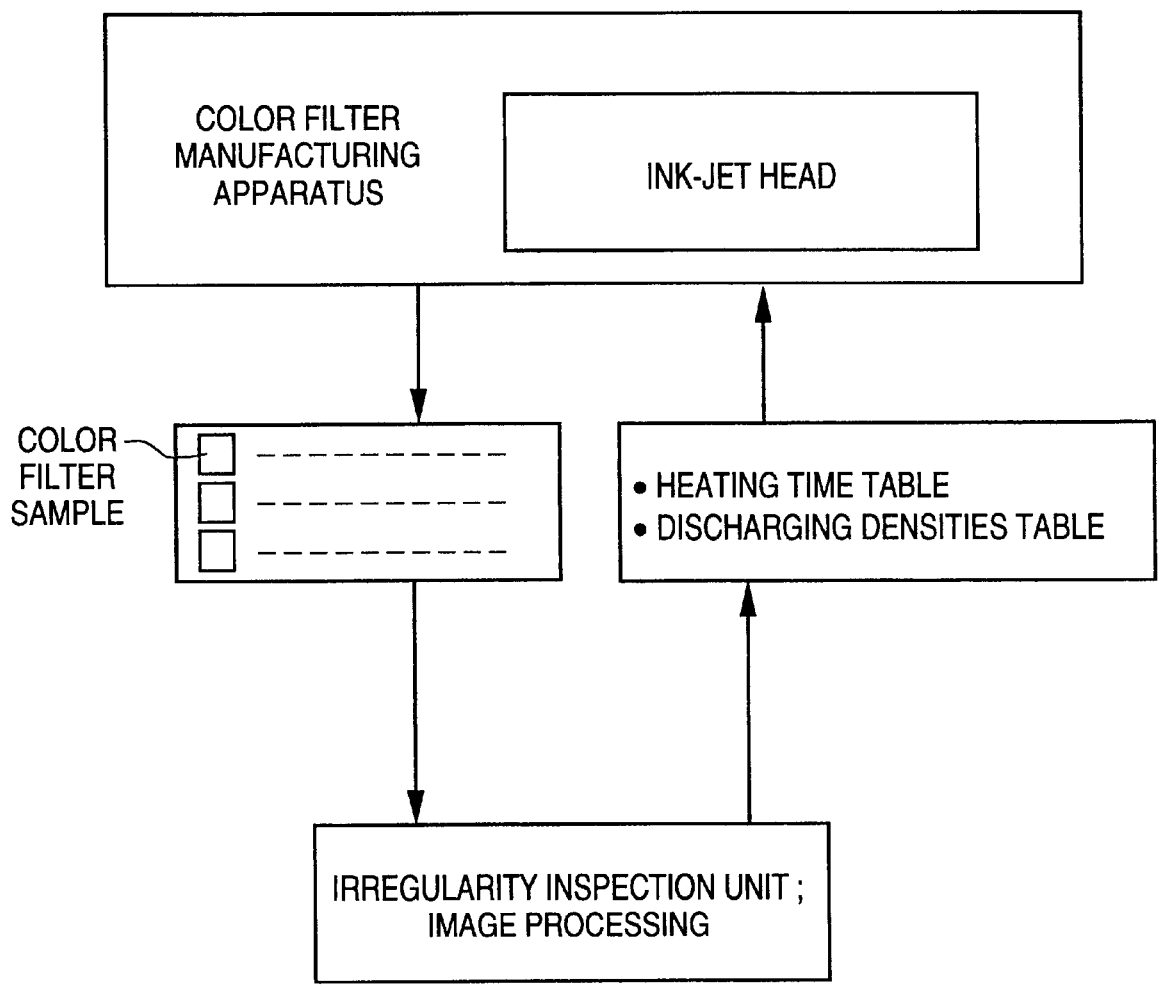
FIG. 19 is a block diagram showing a state wherein color irregularity data about a color filter is fed back to the manufacturing apparatus.
Figure 20:
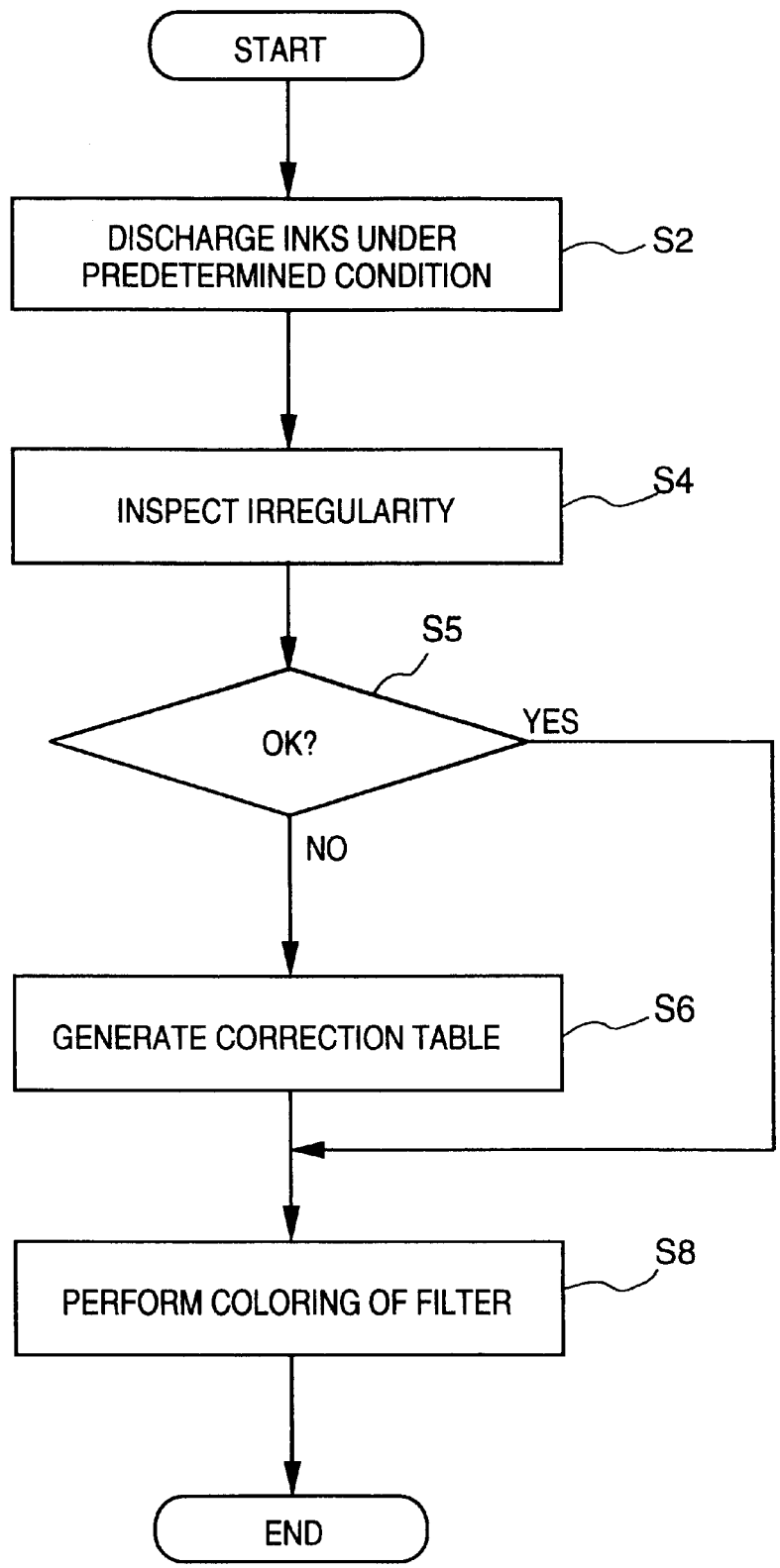
FIG. 20 is a flow chart showing the procedure for feeding back the color irregularity data about the color filter to the manufacturing apparatus.

In practice, as shown in FIGS. 19 and 20, a filter is colored under a predetermined condition, i.e., that condition that the density irregularity in the respective pixels is reduced to 10% or less by shading correction, and is further reduced to 2.5% or less by bit correction, on the basis of the above relationship between the amounts of ink discharged from the ink-jet head and preheat and heat pulses, the data of discharging densities of ink and the above relationship between the amounts of ink discharged and the elapsed time (heating time table, discharging densities table and relationship table between the amount of ink discharged and the elapsed time) (step S2). The filter colored in this manner is subjected, as a sample, to a color irregularity inspection conducted by an irregularity inspection unit (step S4). Note that this inspection of the colored state may be performed by a spot inspection. In this inspection, if the degree of color irregularity of the actually colored filter is 2.5% or less (step S5 Yes), the next color filter may be manufactured under the same condition as described above. If, however, the degree of color irregularity of the color filter exceeds an allowable value (step S5 No), the data for executing shading correction and bit correction is further corrected on the basis of this inspection result, thereby generating a correction table (step S6). Shading correction and bit correction are performed on the basis of the data having undergone further correction, and a filter as a product is colored (step S8). With the above process, a color filter with high color irregularity correction precision can be manufactured.

Further, it is possible to include a step of experimental coloring between steps S6 and S8, and execute step S4 again for inspecting the colored state. Herein, if color irregularity is still large, the step (step S6) of generating the correction table is repeated for a predetermined times. Alternatively, the step may be repeated until the color irregularity is no longer recognized.

The result obtained by simulating the degree of improvement in color irregularity when shading correction and bit correction are combined in the above manner will be described next.

A simulation on variations in the absorbances of the respective pixels after shading correction will be described first.

Assume that pixels (cells) are colored with nozzles in a one-to-one correspondence.

Letting N be the number of nozzles of the ink-jet head, Vn (ng) be the amount of ink discharged from the nth nozzle, Vave=(ΣVn/N) (ng) be the average amount of ink discharged from all the nozzles, Ps ($\mu$m/dot) be the standard discharging pitch at which an ink is discharged from the nozzle with Vn=Vave, and Pr ($\mu$m) be the pitch adjustment resolution, a discharging pitch Pn of the nth nozzle for shading correction is given by $$Pn = MROUND\ (Vn/Vave \cdot Ps,\ Pr)$$

In this equation, MROUND (a, b) is a function for obtaining a value by rounding up or chopping the value of a to the least multiple of the value of b.

In this case, an absorbance variation ratio H(n) among the respective pixels after shading correction can be simulated by the following equation:

$$H(n) = (Pn/Ps) \cdot (Vn/Vave)$$

Figure 21:
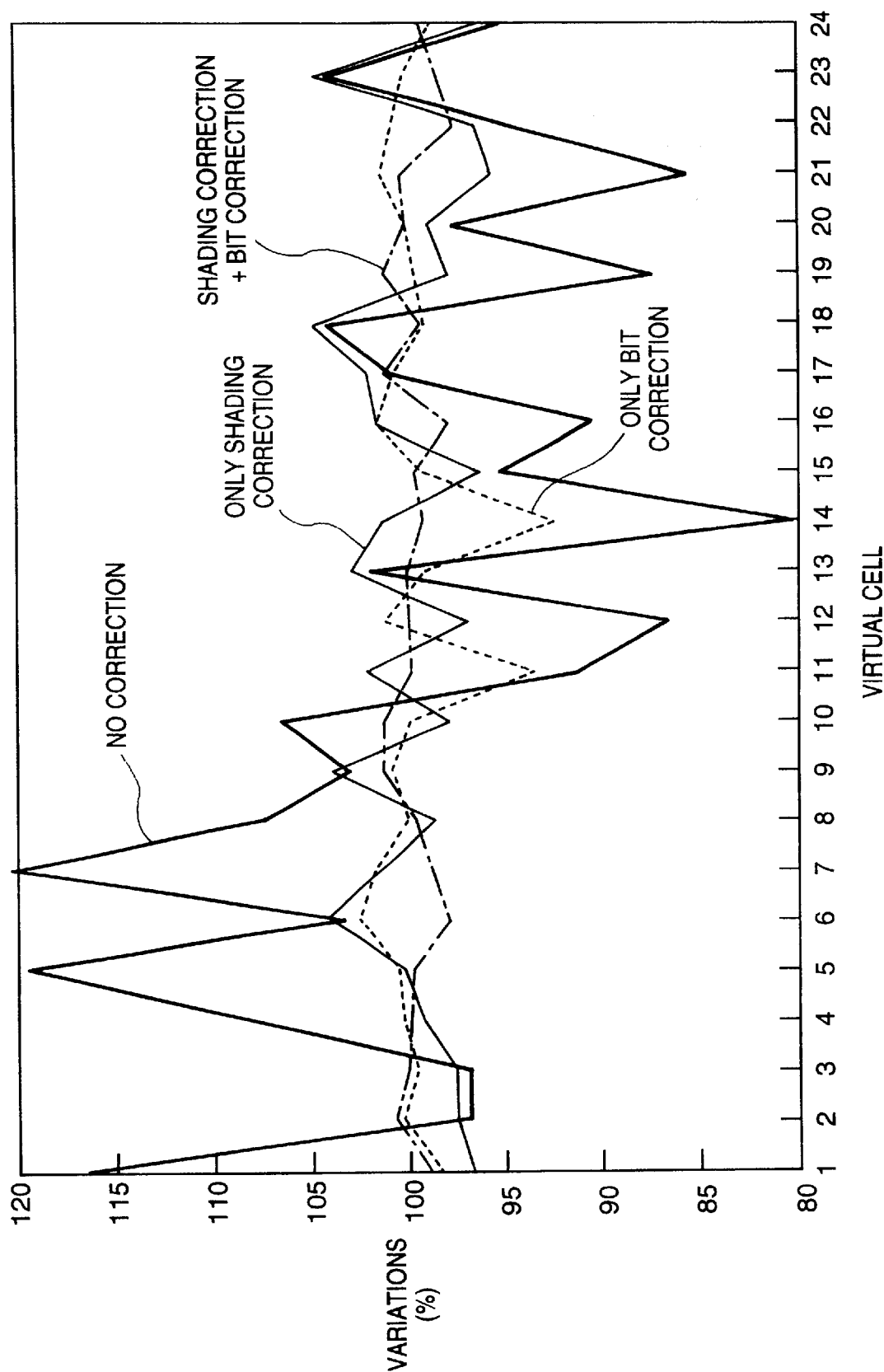
FIG. 21 is a graph showing the result obtained by simulating the degree of color irregularity in each pixel when shading correction and bit correction are combined.

FIG. 21 shows a curve obtained by performing only shading correction, with the abscissa representing the nozzle number and the ordinate representing H(n).

A simulation on variations in the absorbances of the respective pixels (cells) after bit correction will be described next.

Letting an be the slope of the least square approximation line of the function Vn(t) of the amount of ink discharged from each nozzle with respect to the measured heating time, bn be the Y segment of the least square approximation line of Vn(t), and Tr be the heating time adjustment resolution, a heating time Tn set for the nth nozzle to adjust the amount of ink discharged to a target discharging amount Vs by bit correction is given by $$Tn=MROUND((Vs-bn)/an, Tr)$$

where MROUND is the function described above.

In this case, an absorbance variation ratio B(n) among the respective pixels after bit correction is simulated by the following equation:

$$B(n)=(Tn \cdot an+bn)/Vs$$

In this case, when only bit correction is to be performed, Vs=Vave is set. FIG. 21 shows a curve obtained by performing only bit correction, which represents this simulation result.

When shading correction and bit correction are to be combined, a simulation is performed according to $$Vs=Vave/H(n)$$

FIG. 21 shows a curve obtained by performing shading correction+bit correction, which represents this simulation result.

As is apparent from FIG. 21, when shading correction and bit correction are combined, the density irregularity in the respective pixels can be reduced more than when only shading correction or bit correction is performed. In the above embodiment, pixels are continuously colored linearly with ink in the longitudinal direction. If, however, each pixel is constituted by many separate cells, the present invention may be applied to a case wherein ink are intermittently discharged onto the respective cells.

Figure 22:
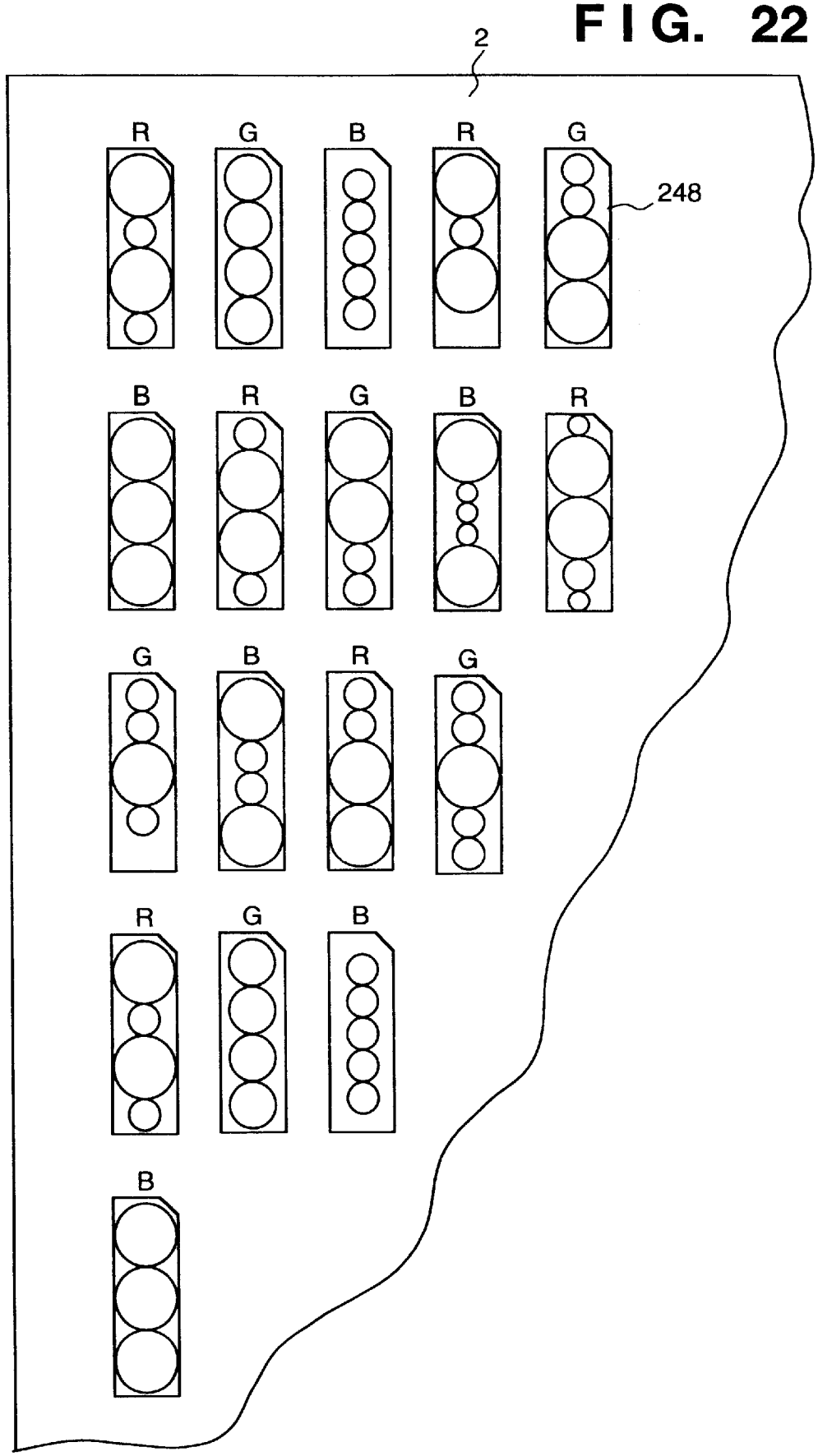
FIG. 22 is a view for explaining another example of how a color filter is colored.

In the above embodiment, as shown in FIG. 13 or 16, each array of pixels are colored in the same color in the longitudinal direction of the pixels. However, when the RGB arrangement of a liquid crystal panel to be manufactured is of a staggered or delta type, the ink discharging positions may be changed in the respective pixels 248, as shown in FIG. 22. Note that the portions, in each pixel 248, which are indicated by the complete circles in FIG. 22 are ink dots.

As described above, according to the above embodiment, in coloring a color filter, the ink discharging pattern is changed for each of arrayed pixels or pixel groups to change the volume of ink discharged and/or the number of times of discharging per unit area, i.e., the discharging density, for each pixel or pixel group. Therefore, a high-quality color filter can be manufactured by greatly reducing the coloring density irregularity among the pixels.

Various changes and modifications of the above embodiments can be made without departing the spirit and scope of the invention.

The present invention is applied to the print apparatus of the system, among various ink-jet recording systems, which has a means (e.g., an electricity-to-heat converter or laser light) for generating heat energy as energy used to discharge an ink, and changes the state of an ink by using the heat energy. According to this system, a high-density, high-resolution recording operation can be realized.

As for the typical structure and principle, it is preferable that the basic structure disclosed in, for example, U.S. Pat. No. 4,723,129 or 4,740,796 is employed. The aforesaid method can be adapted to both a so-called on-demand type apparatus and a continuous type apparatus. In particular, a satisfactory effect can be obtained when the on-demand type apparatus is employed because of the structure arranged in such a manner that one or more drive signals, which rapidly raise the temperature of an electricity-to-heat converter disposed to face a sheet or a fluid passage which holds the fluid (ink) to a level higher than levels at which film boiling takes place are applied to the electricity-to-heat converter in accordance with recording information so as to generate heat energy in the electricity-to-heat converter and to cause the heat effecting surface of the recording head to take place film boiling so that bubbles can be formed in the fluid (ink) to correspond to the one or more drive signals. The enlargement/contraction of the bubble will cause the fluid (ink) to be discharged through a discharging opening so that one or more ink are formed. If a pulse shape drive signal is employed, the bubble can be enlarged/contracted immediately and properly, causing a further preferred effect to be obtained because the fluid (ink) can be discharged while revealing excellent responsibility.

It is preferable that a pulse drive signal disclosed in U.S. Pat. No. 4,463,359 or 4,345,262 be employed. If conditions disclosed in U.S. Pat. No. 4,313,124 which is an invention related to the temperature rising rate at the heat effecting surface are employed, a satisfactory recording result can be obtained.

As an alternative to the structure (linear fluid passage or perpendicular fluid passage) of the recording head disclosed in each of the above-mentioned inventions and having an arrangement that discharge ports, fluid passages and electricity-to-heat converters are combined, a structure having an arrangement that the heat effecting surface is disposed in a bent region and disclosed in U.S. Pat. No. 4,558,333 or 4,459,600 may be employed. In addition, the following structures may be employed: a structure having an arrangement that a common slit is formed to serve as a discharge section of a plurality of electricity-to-heat converters and disclosed in Japanese Patent Laid-Open No. 59-123670; and a structure disclosed in Japanese Patent Laid-Open No. 59-138461 in which an opening for absorbing pressure waves of heat energy is disposed to correspond to the discharge section.

Furthermore, as a recording head of the full line type having a length corresponding to the maximum width of a recording medium which can be recorded by the recording apparatus, either the construction which satisfies its length by a combination of a plurality of recording heads as disclosed in the above specifications or the construction as a single full line type recording head which has integrally been formed can be used.

In addition, the invention is effective for a recording head of the freely exchangeable chip type which enables electrical connection to the recording apparatus main body or supply of ink from the main device by being mounted onto the apparatus main body, or for the case by use of a recording head of the cartridge type provided integrally on the recording head itself.

It is preferred to additionally employ the recording head restoring means and the auxiliary means provided as the component of the present invention because the effect of the present invention can be further stabled. Specifically, it is preferable to employ a recording head capping means, a cleaning means, a pressurizing or suction means, an electricity-to-heat converter, an another heating element or a sub-heating means constituted by combining them and a sub-emitting mode in which an emitting is performed independently from the recording emitting in order to stably perform the recording operation.

Although a fluid ink is employed in the above-mentioned embodiment of the present invention, an ink which is solidified at the room temperature or lower and as well as softened at the room temperature may be used. That is, any ink which is formed into a fluid when the recording signal is supplied may be employed.

Furthermore, an ink which is solidified when it is caused to stand, and liquified when heat energy is supplied in accordance with a recording signal can be adapted to the present invention to positively prevent a temperature rise caused by heat energy by utilizing the temperature rise as energy of state transition from the solid state to the liquid state or to prevent ink evaporation. In any case, an ink which is liquified when heat energy is supplied in accordance with a recording signal so as to be discharged in the form of fluid ink, or an ink which is liquified only after heat energy is supplied, e.g., an ink which starts to solidify when it reaches a recording medium, can be adapted to the present invention. In the above-mentioned case, the ink may be of a type which is held as fluid or solid material in a recess of a porous sheet or a through hole at a position to face the electricity-to-heat converter as disclosed in Japanese Patent Laid-Open No. 54-56847 or Japanese Patent Laid-Open No. 60-71260. It is the most preferred way for the ink to be adapted to the aforesaid film boiling method.

As has been described above, according to the present invention, a high-quality color filter with little color irregularity can be manufactured by changing the ink discharging state for each pixel of a plurality of pixels constituting the color filter or each pixel group.

A color filter with very little color irregularity can be manufactured by performing coarse correction of the color irregularity by shading correction, and fine adjustment by bit correction.

The present invention is not limited to the above embodiments and various changes and modifications can be made within the spirit and scope of the present invention. Therefore, to apprise the public of the scope of the present invention the following claims are made.

What is claimed is:

1. A method of manufacturing a color filter by coloring respective pixels with a plurality of discharged ink arranged in a scanning direction while scanning an ink-jet head and a substrate relative to each other, the ink-jet head having a plurality of ink discharging nozzles in a direction substantially perpendicular to the scanning direction, comprising the steps of:

starting coloring of each pixel on the substrate;

monitoring a variation in the amount of ink discharged within a time interval from the start of coloring each pixel; and performing a coloring operation by setting an ink discharging pattern for each of the arrayed pixels or each pixel group in accordance with the monitored result.

2. The method according to claim 1, wherein the discharging pattern is at least one of a discharging position of an ink in each pixel, discharging intervals, the number of times of discharging, and a volume of a discharged ink.

3. The method according to claim 1, wherein the discharging pattern is set on the basis of a result obtained by monitoring a colored state of each pixel.

4. The method according to claim 1, wherein the discharging pattern is set on the basis of a result obtained by monitoring a state of the ink-jet head.

5. The method according to claim 4, wherein the state of the ink-jet head is a temperature state of said ink-jet head.

6. The method according to claim 1, wherein the discharging pattern is set in accordance with measured variations in the amounts of ink discharged from the respective nozzles of the ink-jet head.

7. The method according to claim 6, wherein the variations in the amounts of ink discharged from the respective nozzles of the ink-jet head are measured before the substrate is colored by the ink-jet head.

8. The method according to claim 1, wherein the discharging pattern is set on the basis of characteristics of changes in the amounts of ink discharged from the respective nozzles of said ink-jet head over time.

9. The method according to claim 8, wherein the characteristics of the changes in the amounts of ink discharged over time are measured before the substrate is colored by the ink-jet head.

10. The method according to claim 1, wherein the discharging pattern is set for each of the pixels or each pixel group arranged in the direction substantially perpendicular to the scanning direction.

11. The method according to claim 1, wherein the discharging pattern is set for each of the pixels or each pixel group arranged in the scanning direction.

12. The method according to claim 1, wherein the step of setting the discharging pattern comprises an adjustment step of adjusting the amount of ink to be discharged onto each pixel and a fine adjustment step of finely adjusting the amount of ink to be discharged after the adjustment step.

13. The method according to claim 12, wherein the adjustment step comprises adjusting a discharging density of ink onto each pixel, and the fine adjustment step comprises adjusting a volume of each discharged ink.

14. The method according to claim 1, wherein the ink-jet head is a head for discharging an ink by using heat energy, with the head having a heat energy generator for generating heat energy applied to the ink.

15. The method according to claim 1, further comprising the step of acquiring data corresponding to an amount of ink discharged from the ink discharge nozzles by monitoring the variation in said monitoring step, wherein the coloring operation is performed by setting an ink discharging pattern for each of the arrayed pixels or each pixel group on the basis of the data acquired in said acquiring step.

16. An apparatus for manufacturing a color filter by coloring respective pixels with a plurality of discharged ink arranged in a scanning direction while scanning an ink-jet head and a substrate relative to each other, the ink-jet head having a plurality of ink discharging nozzles in a direction substantially perpendicular to the scanning direction, comprising:

an ink jet head;

monitor means for monitoring a variation in the amount of ink discharged within a time interval from the start of coloring each pixel; and control means for controlling said ink-jet head to perform a coloring operation by setting an ink discharging pattern for each of the arrayed pixels or each pixel group in accordance with the result monitored by said monitor means.

17. The apparatus according to claim 16, wherein the discharging pattern is at least one of a discharging position of an ink in each pixel, discharging intervals, the number of times of discharging, and a volume of a discharged ink.

18. The apparatus according to claim 16, wherein said control means sets the discharging pattern on the basis of a result obtained by monitoring a colored state of each pixel.

19. The apparatus according to claim 16, wherein said control means monitors a state of said ink-jet head, and sets the discharging pattern of said ink-jet head on the basis of a monitoring result.

20. The apparatus according to claim 19, further comprising a temperature sensor for measuring a temperature of said ink-jet head as a state amount of said ink-jet head.

21. The apparatus according to claim 16, wherein said control means sets the discharging pattern in accordance with variations in the amounts of ink discharged from the respective nozzles of said ink-jet head.

22. The apparatus according to claim 21, wherein the variations in the amounts of ink discharged from the respective nozzles of said ink-jet head are measured before the substrate is colored by said ink-jet head.

23. The apparatus according to claim 16, wherein said control means sets the discharging pattern on the basis of characteristics of changes in the amounts of ink discharged from the respective nozzles of said ink-jet head over time.

24. The apparatus according to claim 23, wherein the characteristics of the changes in the amounts of ink discharged over time are measured before the substrate is colored by said ink-jet head.

25. The apparatus according to claim 16, wherein said control means sets the discharging pattern for each of the pixels or each pixel group arranged in the direction substantially perpendicular to the scanning direction.

26. The apparatus according to claim 16, wherein said control means sets the discharging pattern for each of the pixels or each pixel group arranged in the scanning direction.

27. The apparatus according to claim 16, wherein said ink-jet head is a head for discharging an ink by using heat energy, said head having a heat energy generator for generating heat energy applied to the ink.

28. The apparatus according to claim 16, further comprising data acquiring means for acquiring data corresponding to an amount of ink discharged from the ink discharge nozzles based on the variation monitored by said monitoring means, wherein the coloring operation is performed by setting an ink discharging pattern for each of the arrayed pixels or each pixel group on the basis of the data acquired by said data acquiring means.

29. A print method of performing a print operation while scanning an ink-jet head and an object subjected to a print operation relative to each other, the ink-jet head having a plurality of ink discharging nozzles in a direction substantially perpendicular to a scanning direction, comprising the steps of:

starting ink discharge on the object subjected to the print operation;

monitoring a variation in the amount of ink discharged within a time interval from the start of ink discharge; and performing a print operation by setting an ink discharging pattern for each of the plurality of ink discharging nozzles or each nozzle group in accordance with the monitored result.

30. The method according to claim 29, wherein the discharging pattern is at least one of a discharging position of an ink, discharging intervals, the number of times of discharging, and a volume of a discharged ink.

31. The method according to claim 29, wherein the step of setting the discharging pattern comprises an adjustment step of adjusting the amount of ink discharged onto the object and a fine adjustment step of finely adjusting the amount of ink discharged after the adjustment step.

32. The method according to claim 31, wherein the adjustment step comprises adjusting a discharging step comprises adjusting a volume of each discharged ink.

33. The method according to claim 29, wherein said ink-jet head is a head for discharging an ink by using heat energy, said head having a heat energy generator for generating heat energy applied to the ink.

34. The method according to claim 29, further comprising the step of acquiring data corresponding to an amount of ink discharged from the ink discharge nozzles by monitoring the variation in said monitoring step, wherein the coloring operation is performed by setting an ink discharging pattern for each of the arrayed pixels or each pixel group on the basis of the data acquired in said acquiring step.

35. A method of manufacturing a color filter by coloring respective pixels with a plurality of discharged ink while scanning an ink-jet head and a substrate relative to each other, the ink-jet head having a plurality of ink discharging nozzles, comprising the steps of:

starting coloring of each pixel on the substrate;

monitoring a state which corresponds to a variation in the amount of ink discharged within a time interval from the start of coloring each pixel; and performing a coloring operation by setting an ink discharging pattern for each of the arrayed pixels or each pixel group in accordance with the monitored result.

36. The method according to claim 35, further comprising the step of acquiring data corresponding to an amount of ink discharged from the ink discharge nozzles by monitoring the variation in said monitoring step, wherein the coloring operation is performed by setting an ink discharging pattern for each of the arrayed pixels or each pixel group on the basis of the data acquired in said acquiring step.

37. The method according to claim 35, wherein the discharging pattern is a discharging position of an ink in each pixel.

38. The method according to claim 35, wherein the discharging pattern is discharging intervals.

39. The method according to claim 35, wherein the discharging pattern is a number of times of discharging per unit area.

40. The method according to claim 35, wherein the discharging pattern is a volume of a discharged ink.

41. A method of manufacturing a color filter by coloring respective pixels with a plurality of discharged inks while scanning an ink-jet head having a plurality of ink discharging nozzles, comprising the steps of:

starting coloring of each pixel on the substrate;

monitoring a colored state of each pixel based on a predetermined time period.

acquiring data corresponding to an amount of ink discharged from each of the ink discharge nozzles by monitoring in said monitoring step; and performing a coloring operation by setting an ink discharging pattern for each of the arrayed pixels or each pixel group on the basis of the data acquired in said acquiring step.

42. The method according to claim 41, wherein the discharging pattern is a discharging position of an ink in each pixel.

43. The method according to claim 41, wherein the discharging pattern is discharging intervals.

44. The method according to claim 41, wherein the discharging pattern is a number of times of discharging per unit area.

45. The method according to claim 41, wherein the discharging pattern is a volume of a discharged ink.

46. An apparatus for manufacturing a color filter by coloring respective pixels with a plurality of discharged inks while scanning an ink jet head and a substrate relative to each other, the ink jet head having a plurality of ink discharging nozzles, comprising:

an ink jet head;

monitoring means for monitoring a state which corresponds to a variation in the amount of ink discharged within a time interval from the start of coloring each pixel; and control means for controlling said ink-jet head to perform a coloring operation by setting an ink discharging pattern for each of the arrayed pixels or each pixel group in accordance with the result monitored by said monitoring means.

47. The apparatus according to claim 46, wherein the discharging pattern is a volume of a discharged ink.

48. The apparatus according to claim 46, wherein the discharging pattern is discharging intervals.

49. The method according to claim 46, wherein the discharging pattern is a number of times of discharging per unit area.

50. The apparatus according to claim 46, wherein the discharging pattern is a volume of a discharged ink.

51. An apparatus for manufacturing a color filter by coloring respective pixels with a plurality of discharged ink while scanning an ink-jet head and a substrate relative to each other, the ink-jet head having a plurality of ink discharging nozzles, comprising:

an ink-jet head;

monitoring means for monitoring a state which corresponds to a variation in the amount of ink discharged within a time interval from the start of coloring each pixel; and control means for controlling said ink-jet head to perform a coloring operation by setting an ink discharging pattern for each of the arrayed pixels or each pixel group in accordance with the result monitored by said monitoring means.

52. The apparatus according to claim 51, wherein the discharging pattern is a discharging position of an ink in each pixel.

53. The apparatus according to claim 51, wherein the discharging pattern is discharging intervals.

54. The method according to claim 51, wherein the discharging pattern is a number of times of discharging per unit area.

55. The apparatus according to claim 51, wherein the discharging pattern is a volume of a discharged ink.

56. A method of manufacturing a color filter by coloring respective filter elements with a plurality of discharged inks while scanning an ink-jet head and a substrate relative to each other, the ink-jet head having a plurality of ink discharging nozzles, comprising:

a first manufacturing step coloring each filter element by discharging a plurality of inks from said ink-jet head;

a monitoring step of monitoring a coloring state of the filter element colored by the plurality of discharged inks; and manufacturing the color filter after changing a total amount of ink discharged to the filter element on the basis of the monitored result in the monitoring step.

57. The method according to claim 56, wherein the total amount of the ink is changed by changing a discharging position of the inks.

58. The method according to claim 56, wherein the total amount of the ink is changed by changing discharging intervals of the inks.

59. The method according to claim 56, wherein the total amount of the ink is changed by changing a number of times of discharging per unit area.

60. The method according to claim 56, wherein the total amount of the ink is changed by changing volumes of the discharging inks.

61. A method of manufacturing a color filter by coloring respective filter elements with a plurality of discharged inks while scanning an ink-jet head and a substrate relative to each other, the ink-jet head having a plurality of ink discharging nozzles comprising:

a first manufacturing step of coloring each filter element by discharging inks from the ink-jet head at a first discharging condition;

a monitoring step of monitoring a coloring state of the filter element of the color filter manufactured in the first manufacturing step;

a changing step of changing a discharging condition from the first discharging condition to a second discharging condition on the basis of the monitored result in the monitoring step; and manufacturing the color filter after the first manufacturing step by coloring each filter element by discharging inks from the ink-jet at the second discharging condition.

62. The method according to claim 61, wherein the discharging condition is a discharging position of the inks in the filter element.

63. The method according to claim 61, wherein the discharging condition is discharging intervals of the inks in the filter element.

64. The method according to claim 61, wherein the discharging condition is a number of times of discharging per unit area in the filter element.

65. The method according to claim 61, wherein the discharging condition is volumes of discharging inks in the filter element.

66. A method of manufacturing a color filter by coloring each filter element by discharging inks from an ink-jet head, comprising:

a first manufacturing step of coloring each filter element by discharging inks from said ink-jet head in a first coloring condition;

a monitoring step of monitoring a coloring condition of the filter element of the color filter manufactured in the first manufacturing step;

a changing step of chaning a coloring condition from the first coloring condition to a second coloring condition on the basis of the monitored result in the monitoring step; and manufacturing the color filter after the first manufacturing step by coloring each filter element by discharging inks from the ink-jet at the second coloring condition.

67. The method according to claim 66, wherein the coloring condition is at least one of an ink discharging position in the filter element, ink discharging interval, a number of times of discharging per unit area and volumes of discharging inks.

68. An apparatus for manufacturing a color filter by coloring respective filter elements with a plurality of discharged inks while scanning an ink-jet head and a substrate relative to each other, comprising:

an ink jet head having a plurality of ink discharging nozzles;

first manufacturing means for coloring each filter elemebt by discharging a plurality of inks from said ink-jet head;

monitoring means for monitoring a coloring state of the filter element colored by the plurality of discharged inks; and second manufacturing means for coloring each filter element by discharging a plurality of inks after changing a total amount of ink discharged to the filter element on the basis of the monitored result by said monitoring means.

69. The apparatus according to claim 68, wherein the total amount of the ink is changed by changing discharging position of the inks.

70. The apparatus according to claim 68, wherein the total amount of ink is changed by changing a discharging intervals of the inks.

71. The apparatus according to claim 68, wherein the total amount of the ink is changed by changing a number of times of discharging per unit area.

72. The apparatus according to claim 68, wherein the total amount of the ink is changed by changing volumes of the discharging inks.

73. An apparatus for manufacturing a color filter by coloring respective filter elements with a plurality of discharged inks while scanning an ink-jet head and a substrate relative to each other, comprising:

an ink jet head having a plurality of ink discharging nozzles;

first manufacturing means for coloring each filter element by discharging inks from the ink-jet head at a first discharging condition;

monitoring means for monitoring a coloring state of the filter element of the color filter manufactured by said first manufacturing means;

changing means for changing a discharging condition from the first discharging condition to a second discharging condition on the basis of the monitored result by said monitoring means; and second manufacturing means for coloring each filter element by discharging inks from the ink-jet at the second discharging condition.

74. The apparatus according to claim 73, wherein the discharging condition is a discharging position of the inks in the filter element.

75. The apparatus according to claim 73, wherein the discharging condition is discharging intervals of the inks in the filter element.

76. The apparatus according to claim 73, wherein the discharging condition is a number of times of discharging per unit area in the filter element.

77. The apparatus according to claim 73, wherein the discharging condition is volumes of discharging inks in the filter element.

78. An apparatus for manufacturing a color filter by coloring each filter element by discharging inks from an ink-jet head, comprising:

an ink-jet head;

first manufacturing means for coloring each filter element by discharging inks from said ink-jet head in a first coloring condition;

monitoring means for monitoring a coloring condition of the filter element of the color filter manufactured by said first manufacturing means;

changing means for changing a coloring condition from the first coloring condition to a second coloring condition on the basis of the monitored result by said monitoring means; and second manufacturing means for coloring each filter element by discharging inks from said ink-jet head at the second coloring condition.

79. The method according to claim 78, wherein the coloring condition is at least one of an ink discharging position in the filter element, ink discharging interval, a number of times of discharging per unit area and volumes of discharging inks.

* * * * *

UNITED STATES PATENT AND TRADEMARK OFFICE
CERTIFICATE OF CORRECTION

PATENT NO.    : 6,258,405 B1
DATED         : July 10, 2001
INVENTOR(S)   : Nobuhito Yamaguchi et al.

It is certified that error appears in the above-identified patent and that said Letters Patent is hereby corrected as shown below:

Column 15,
Line 38, "ink" should read -- inks --.

Column 16,
Line 41, "ink" should read -- inks --.

Column 17,
Line 66, "discharging" should read -- discharging density of ink onto the object, and the fine adjustment --.

Column 18,
Line 14, "ink" should read -- inks --.
Line 45, "head" should read -- head and a substrate relative to each other, the ink-jet head --.
Line 49, "period." should read -- period; --.

Column 19,
Lines 7-10, "¶ monitoring means for monitoring a state which corresponds to a variation in the amount of ink discharged within a time interval from the start of coloring each pixel; and" should read
-- ¶ monitoring means for monitoring a colored state of each pixel based on
a predetermined time period;
    data acquiring means for acquiring data corresponding to an amount of
ink discharged from each of the ink discharge nozzles based on the color state
monitored by said monitoring means; and --.
Line 16, "volume of a discharged ink" should read -- discharging position of an ink in each pixel. --.
Line 25, "ink" should read -- inks --.
Line 53, "step" should read -- step of --.

UNITED STATES PATENT AND TRADEMARK OFFICE
CERTIFICATE OF CORRECTION

PATENT NO.   : 6,258,405 B1
DATED        : July 10, 2001
INVENTOR(S)  : Nobuhito Yamaguchi et al.

It is certified that error appears in the above-identified patent and that said Letters Patent is hereby corrected as shown below:

<u>Column 20,</u>
Line 46, "chaning" should read -- changing --.
Line 65, "elemebt" should read -- element --.

Signed and Sealed this

Twenty-sixth Day of February, 2002

*Attest:*

*Attesting Officer*

JAMES E. ROGAN
*Director of the United States Patent and Trademark Office*